(12) United States Patent
Ikarashi

(10) Patent No.: US 10,929,502 B2
(45) Date of Patent: Feb. 23, 2021

(54) MATRIX TRIANGULATION APPARATUS, MATRIX TRIANGULATION METHOD, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/571,156

(22) PCT Filed: May 11, 2016

(86) PCT No.: PCT/JP2016/063959
§ 371 (c)(1),
(2) Date: Nov. 1, 2017

(87) PCT Pub. No.: WO2016/181981
PCT Pub. Date: Nov. 17, 2016

(65) Prior Publication Data
US 2018/0260362 A1      Sep. 13, 2018

(30) Foreign Application Priority Data

May 12, 2015   (JP) .............................. JP2015-097279

(51) Int. Cl.
*G06F 17/16*  (2006.01)
*G06F 7/72*   (2006.01)
(52) U.S. Cl.
CPC .............. *G06F 17/16* (2013.01); *G06F 7/724* (2013.01)

(58) Field of Classification Search
CPC ............ G06F 7/72; G06F 7/724; G06F 17/16
See application file for complete search history.

(56) References Cited

U.S. PATENT DOCUMENTS

| 7,092,522 B1 | 8/2006 | Futa |
| 8,347,192 B1 | 1/2013 | Langhammer |
| 2008/0095357 A1 | 4/2008 | Kitamura et al. |

FOREIGN PATENT DOCUMENTS

| JP | 2001-92807 A | 4/2001 |
| JP | 2005-124194 A | 5/2005 |
| JP | 2006-227562 A | 8/2006 |

OTHER PUBLICATIONS

Extended European Search Report dated Dec. 3, 2018 in European Patent Application No. 16792706.0 citing document AX therein, 7 pages.

(Continued)

*Primary Examiner* — Matthew D Sandifer
(74) *Attorney, Agent, or Firm* — Oblon, McClelland, Maier & Neustadt, L.L.P.

(57) ABSTRACT

In a process of taking a first square matrix formed from elements of a finite field as input and obtaining at least some of entries of a second square matrix which includes an upper triangular portion resulting from triangulation of the first square matrix, product-sum operation is performed on entries as operands at multiple positions in a matrix which is based on the first square matrix to obtain a product-sum operation result corresponding to an entry at a different position than the operands, and reduction of the product-sum operation result is performed.

5 Claims, 12 Drawing Sheets

(56) References Cited

OTHER PUBLICATIONS

Nagarajan, A. et al. "Galois Field Hardware Architectures for Network Coding", Architectures for Networking and Communications Systems, ACM, XP058122870, Oct. 25, 2010, pp. 1-9.
International Search Report dated Aug. 2, 2016, in PCT/JP2016/063959 filed May 11, 2016.
Japanese Office Action dated Aug. 2, 2016, in corresponding Japan Application 2015-097279 with an English Translation, 7 pages.
Ikeda, "Application of Modern Mathematics", Morikita Publishing, pp. 107-108, (1975), 5 pages with partial translation.
Mori, "Linear Computation", Iwanami Shoten, pp. 1-10, (1994), 14 pages with partial translation.
European Office Action dated Sep. 9, 2019 in Patent Application No. 16 792 706.0, citing document AX therein, 9 pages.
Gene H. Golub et al., "General Linear Systems" In: "Matrix Computations, Chapter 3", XP55618064, Jan. 1, 1996, pp. 87-132.
Summons to attend oral proceedings pursuant to Rule 115(1) EPC issued on Apr. 23, 2020 in corresponding European Patent Application No. 16 792 706.0, 11 pages.
Office Action dated Sep. 10, 2020 in Chinese Application No. 201680025956.4 (w/English translation).
Li Hui, "Several Common Methods of Product and Calculation", Mar. 2011, vol. 38, No. 3, pp. 101 and 103 (w/English abstract).

MATRIX TRIANGULATION APPARATUS, MATRIX TRIANGULATION METHOD, AND PROGRAM

TECHNICAL FIELD

The present invention relates to a technique for performing triangulation of a square matrix whose entries belong to a finite field.

BACKGROUND ART

Triangulation of a square matrix whose entries belong to a finite field requires at least operations between entries and reductions (divisions) (see Non-patent Literatures 1 and 2, for instance).

PRIOR ART LITERATURE

Non-Patent Literature

Non-patent Literature 1: Kazusada Ikeda, "Application of Modern Mathematics", Morikita Publishing, Mar. 5, 1975, pp. 107-108.

Non-patent Literature 2: Masatake Mori, Masaaki Sugihara, and Kazuo Murota, "Linear Computation", Iwanami Shoten, Feb. 10, 1994, pp. 1-10.

SUMMARY OF THE INVENTION

Problems to be Solved by the Invention

Conventional triangulation methods involve frequent performance of "recursive operation", which performs an operation on an entry as an operand at a certain position in a matrix and updating the operand entry according to the result of the operation. For example, in "sweep-out method", one of conventional triangulation methods, a process of multiplying a certain row by the inverse element of a certain entry and subtracting the resulting row from another row so as to update the other row is recursively repeated on each row. When the entries of a matrix are the elements of a finite field, reduction has to be performed each time an entry of the matrix is updated, leading to an increased number of reductions associated with triangulation.

An object of the present invention is to decrease the number of reductions in triangulation of a square matrix whose entries belong to a finite field.

Means to Solve the Problems

In a process of taking a first square matrix formed from elements of a finite field as input and obtaining at least some of entries of a second square matrix which includes an upper triangular portion resulting from triangulation of the first square matrix, product-sum operation is performed on entries as operands at multiple positions in a matrix which is based on the first square matrix to obtain a product-sum operation result corresponding to an entry at a different position than the operands, and reduction of the product-sum operation result is performed.

Effects of the Invention

The present invention obtains a product-sum operation result corresponding to an entry at a different position than the operands by product-sum operation. No recursive processing for updating matrix entries is required during the process of such product-sum operation. Hence, reduction also need not be performed until completion of the product-sum operation. Consequently, the number of reductions in triangulation of a square matrix whose entries belong to a finite field can be decreased.

DETAILED DESCRIPTION OF THE EMBODIMENTS

Figure 1:
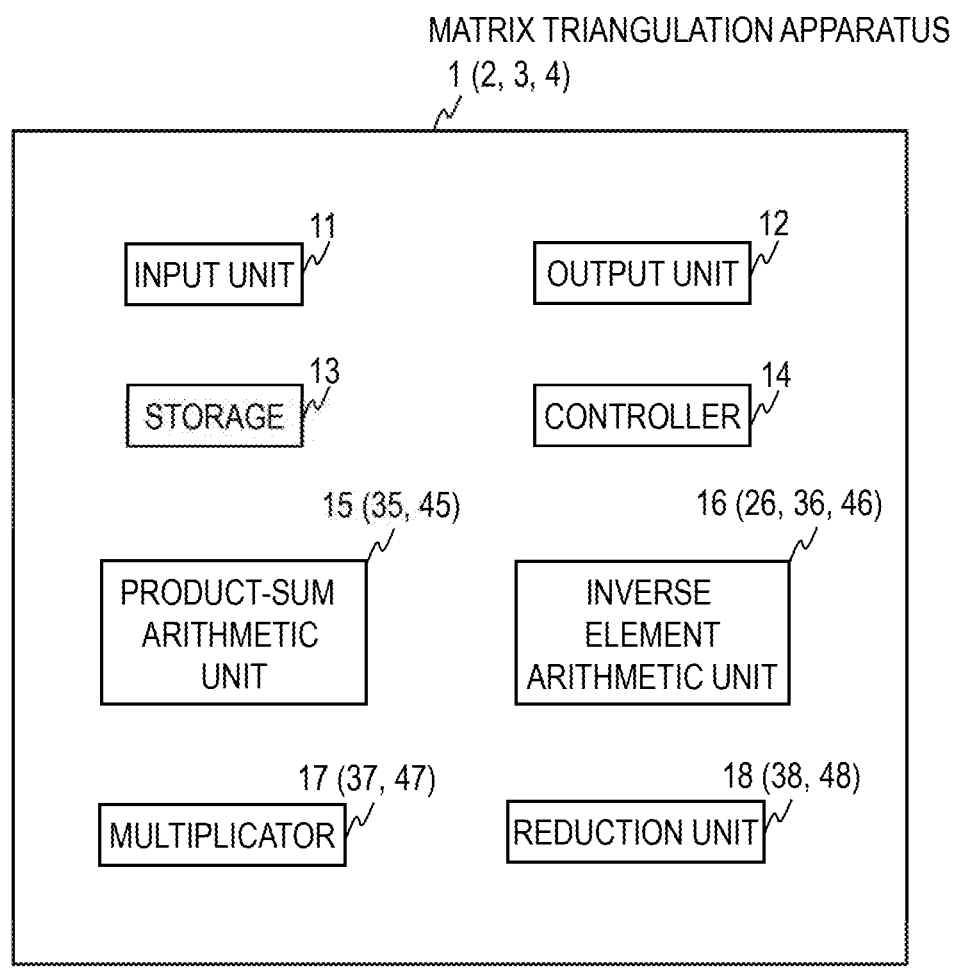
FIG. 1 is a block diagram illustrating a functional configuration of a matrix triangulation apparatus according to an embodiment.

Embodiments of the present invention will be described below.

[Overview]

First, the present invention will be generally described.

According to embodiments of the present invention, a "first square matrix" formed from the elements of a finite field is taken as input, and at least some of the entries of a "second square matrix" which includes an "upper triangular portion" resulting from triangulation of the "first square matrix" are obtained. The entries of the "second square matrix" are also the elements of the finite field. In the process of the triangulation, product-sum operation is performed on entries as operands at multiple positions in a matrix which is based on the "first square matrix" to obtain a product-sum operation result corresponding to an entry at a different position than the operands (different in at least either of row and column), and reduction of the product-sum operation result is performed. Such a product-sum operation is a linear operation, requiring no recursive processing for updating matrix entries during the process of product-sum operation. Thus, reduction can be performed after completion of product-sum operation, so that the number of reductions in triangulation of a square matrix whose entries belong to a finite field can be decreased. Note that the "finite field" may be a prime field or an extension field. "Reduction" in the case where the "finite field" is a prime field is a modulo operation with a positive integer such as a prime number as the modulus. "Reduction" in the case where the "finite field" is an extension field is conversion (division with an irreducible polynomial) of a polynomial (a polynomial representing the extension field) by use of an irreducible polynomial. When recursive operation is necessary in addition to the aforementioned product-sum operation during the process of triangulation, such recursive operation may be performed and then reduction may be performed. Even in such a case, due to performance of the aforementioned product-sum operation, the number of recursive operations could still be significantly decreased compared to conventional methods and the number of reductions could be decreased as well.

The "second square matrix" may be an upper triangular matrix (an upper triangular square matrix) formed from an "upper triangular portion" and zero entries, or a square matrix including an "upper triangular portion" and a "lower triangular portion". Note that the product of the lower triangular matrix including the "lower triangular portion" and the "first square matrix" will be the upper triangular matrix including the "upper triangular portion". In other words, it may be either B=A' (the "second square matrix" being an upper triangular matrix formed from the "upper triangular portion" and zero entries) or B=L+A' (the "second square matrix" being a square matrix including the "upper triangular portion" and the "lower triangular portion"). Here, L represents the lower triangular matrix including the "lower triangular portion", A represents the "first square matrix", A' represents the upper triangular matrix including the "upper triangular portion", B represents the "second square matrix", and the relationship LA=A' is satisfied. Also, in the processing for obtaining the "second square matrix" from the "first square matrix", the entries of the "lower triangular portion" may be assigned to entries that become zero during the process of triangulation of the "first square matrix". This can save a storage area for storing the "lower triangular portion". That is to say, entries that become zero during the process of triangulation of the "first square matrix" need not be kept in a storage area. Thus, such "storage area for entries that become zero" may be also used for storage of entries of the "lower triangular portion". This eliminates the necessity of an area for exclusively storing the entries of the "lower triangular portion". Note that "zero" means an additive identity element. A specific example of this will be described in the first and third embodiments.

The process of triangulation may also include an inverse element operation process for obtaining the inverse element of entry X and the inverse element of entry Y which are based on entries of the "first square matrix". The entries X and Y are elements of the "finite field". It is also possible to obtain a value representing the inverse element $(XY)^{-1}$ of XY, obtain a value representing the inverse element $X^{-1}$ of entry X by multiplication of the value representing the inverse element $(XY)^{-1}$ by entry Y, and obtain a value representing the inverse element $Y^{-1}$ of entry Y by multiplication of the value representing the inverse element $(XY)^{-1}$ and entry X. In this way, two inverse elements $X^{-1}$ and $Y^{-1}$ can be obtained via a single operation of inverse element $(XY)^{-1}$ and two multiplications. While inverse elements involve a very large amount of computation, this method can decrease the amount of computation compared to two inverse element operations (streamlining 1 of inverse elements). A specific example of this will be described in the third embodiment.

When the process of triangulation includes an inverse element operation process for obtaining the inverse element $X^{-1}=x^{-\alpha}$ of entry $X=x^{\alpha}$ which is based on an entry of the "first square matrix", an inverse element operation process for obtaining the inverse element $X^{-1}$ of entry X by multiplication $x^{-c}x^{c-\alpha}$ using inverse element $x^{-c}$ calculated in advance can be performed. Here, X and x are elements of the finite field, c and α are positive integer constants, and $1 \le \alpha \le c$ holds. In this case, the inverse element can be obtained via multiplications, enabling reduction of the amount of computation (streamlining 2 of inverse elements). Alternatively, the inverse element $X^{-1}=x^{-\alpha}$ corresponding to a may be obtained by making reference to $x^{-\alpha}$ calculated in advance for α=1, 2, . . . , c. That is, for each integer a satisfying $1 \le \alpha \le c$, $X^{-1}=x^{-c}x^{c-\alpha}$ will be as follows:

|  | α | | | |
| --- | --- | --- | --- | --- |
|  | 1 | 2 | ... | c |
| $X^{-1} = x^{-c}x^{c-\alpha}$ | $x^{-1}$ | $x^{-2}$ | ... | $x^{-c}$ |

Thus, by storing a lookup table associating α=1, 2, . . . , c with $X^{-1}=x^{-1}$ $x^{-2}$, . . . , $x^{-c}$ (that is, $x^{-\alpha}$) in a storage, an inverse element can be obtained by a single reference to the table. Such a lookup table may be prepared for the range of α=1, 2, . . . , c, and is of a small size (streamlining 3 of inverse elements). A specific example of these will be described in the second embodiment.

Referring now to the drawings, individual embodiments will be described below.

First Embodiment

Figure 2:
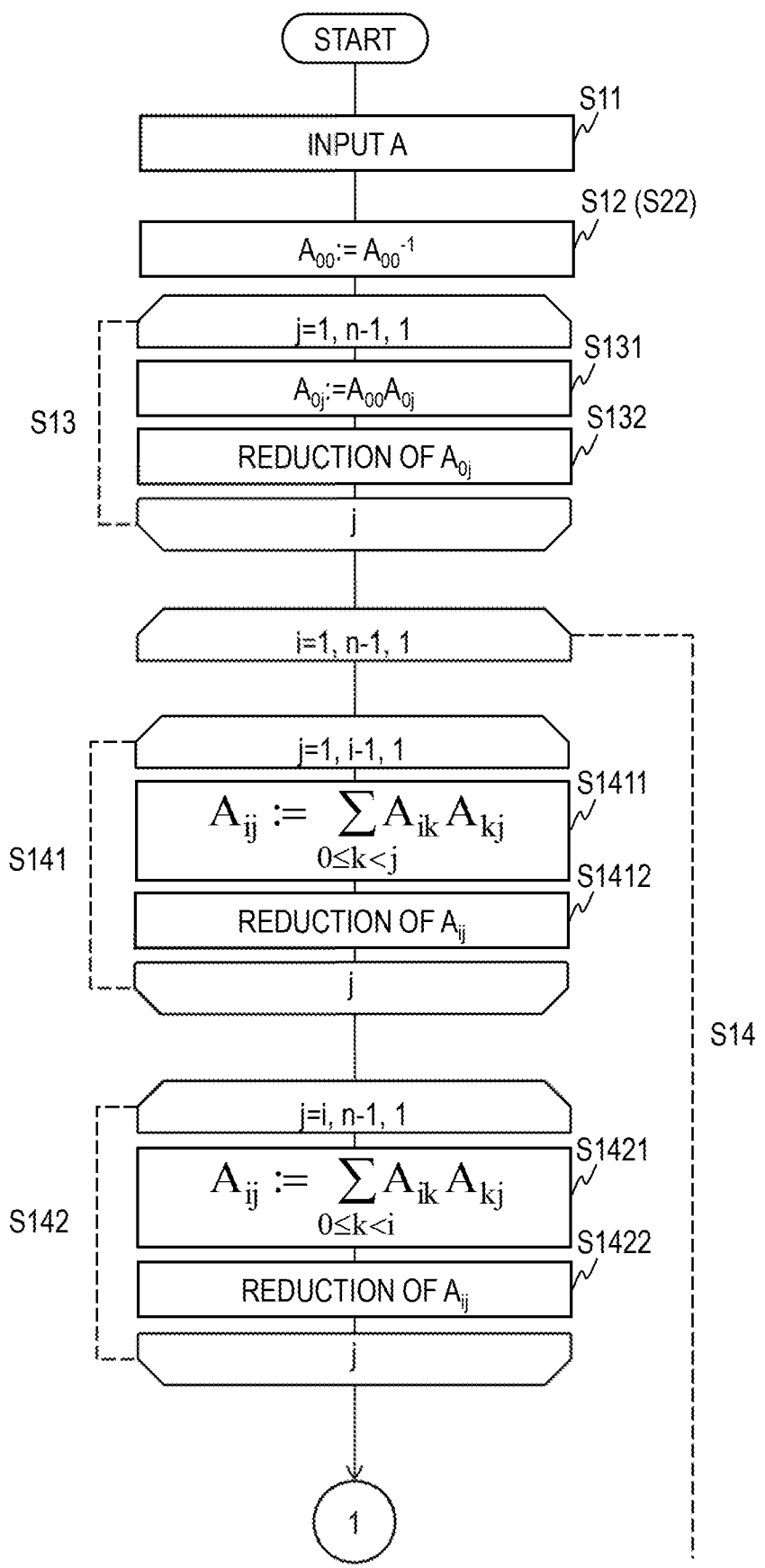
FIG. 2 is a flow diagram illustrating processing by the matrix triangulation apparatus according to the embodiment.
Figure 3:
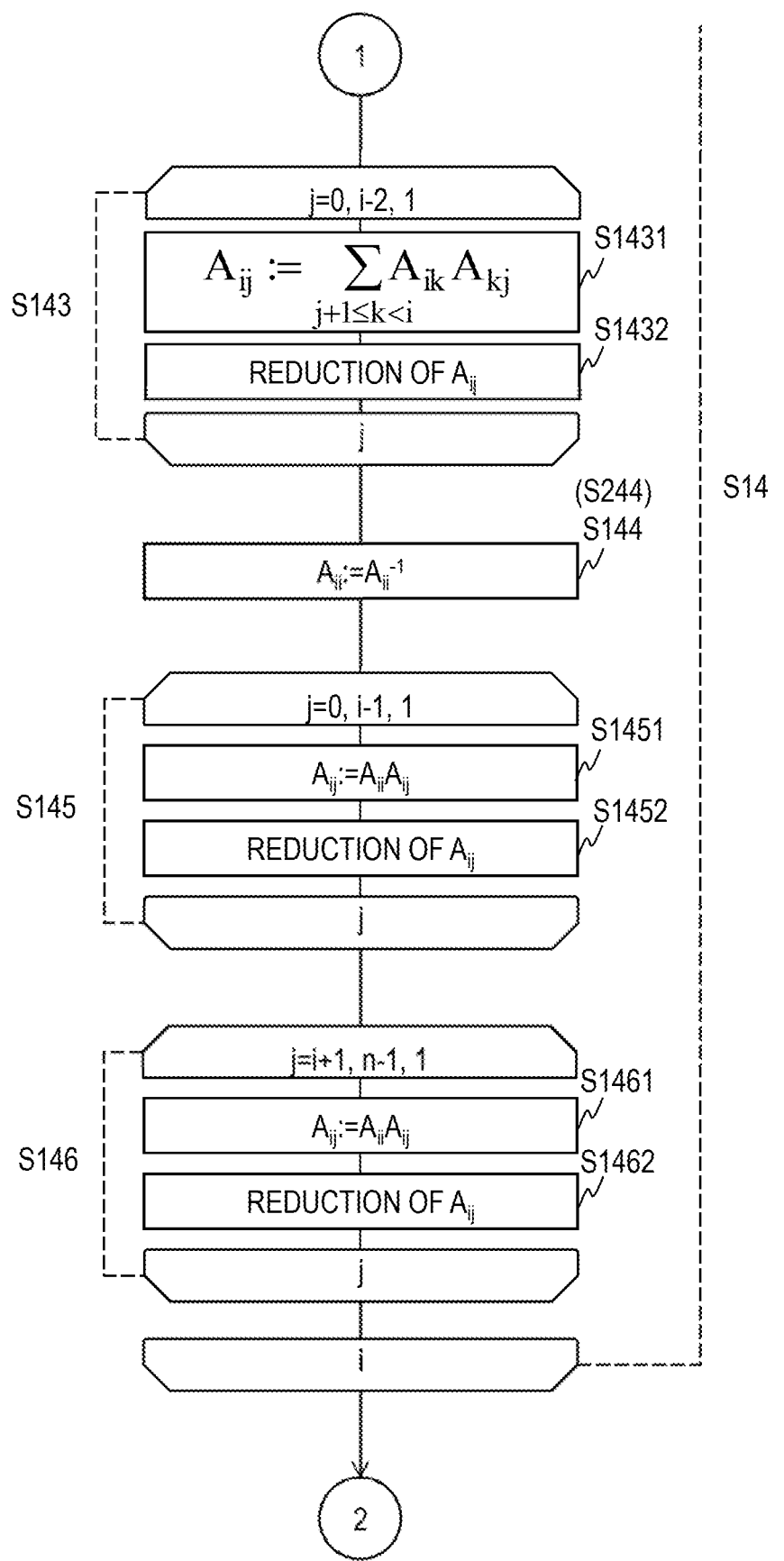
FIG. 3 is a flow diagram illustrating processing by the matrix triangulation apparatus according to the embodiment.
Figure 4:
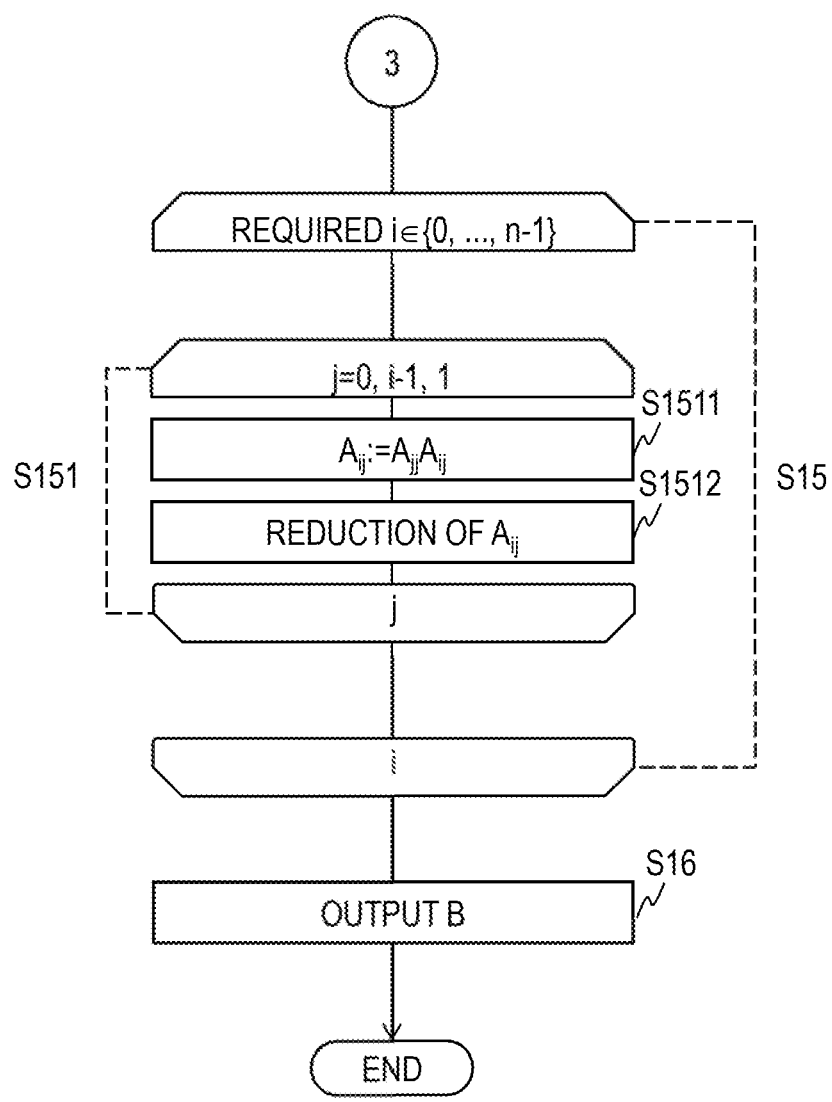
FIG. 4 is a flow diagram illustrating processing by the matrix triangulation apparatus according to the embodiment.
Figure 5:
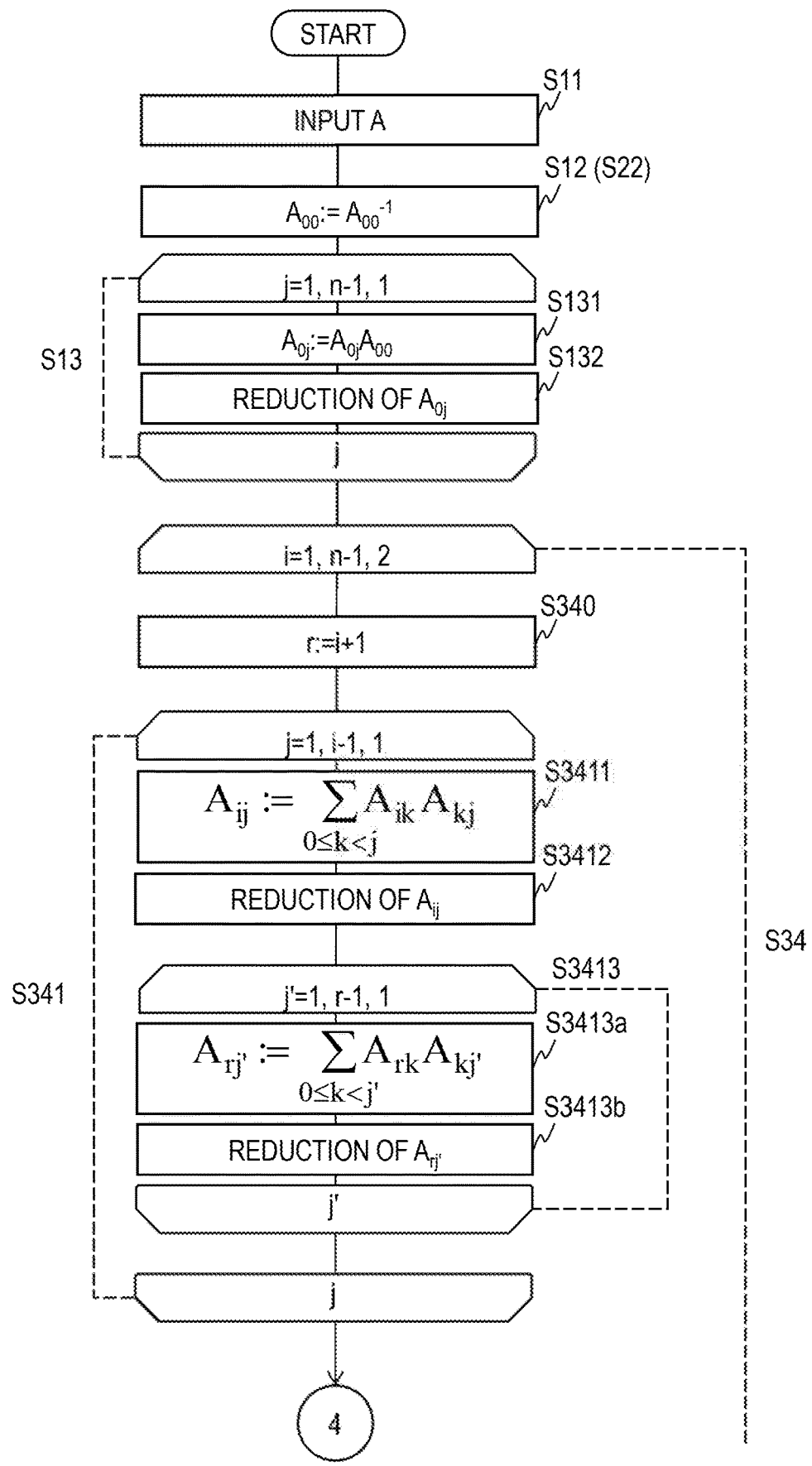
FIG. 5 is a flow diagram illustrating processing by the matrix triangulation apparatus according to an embodiment.
Figure 6:
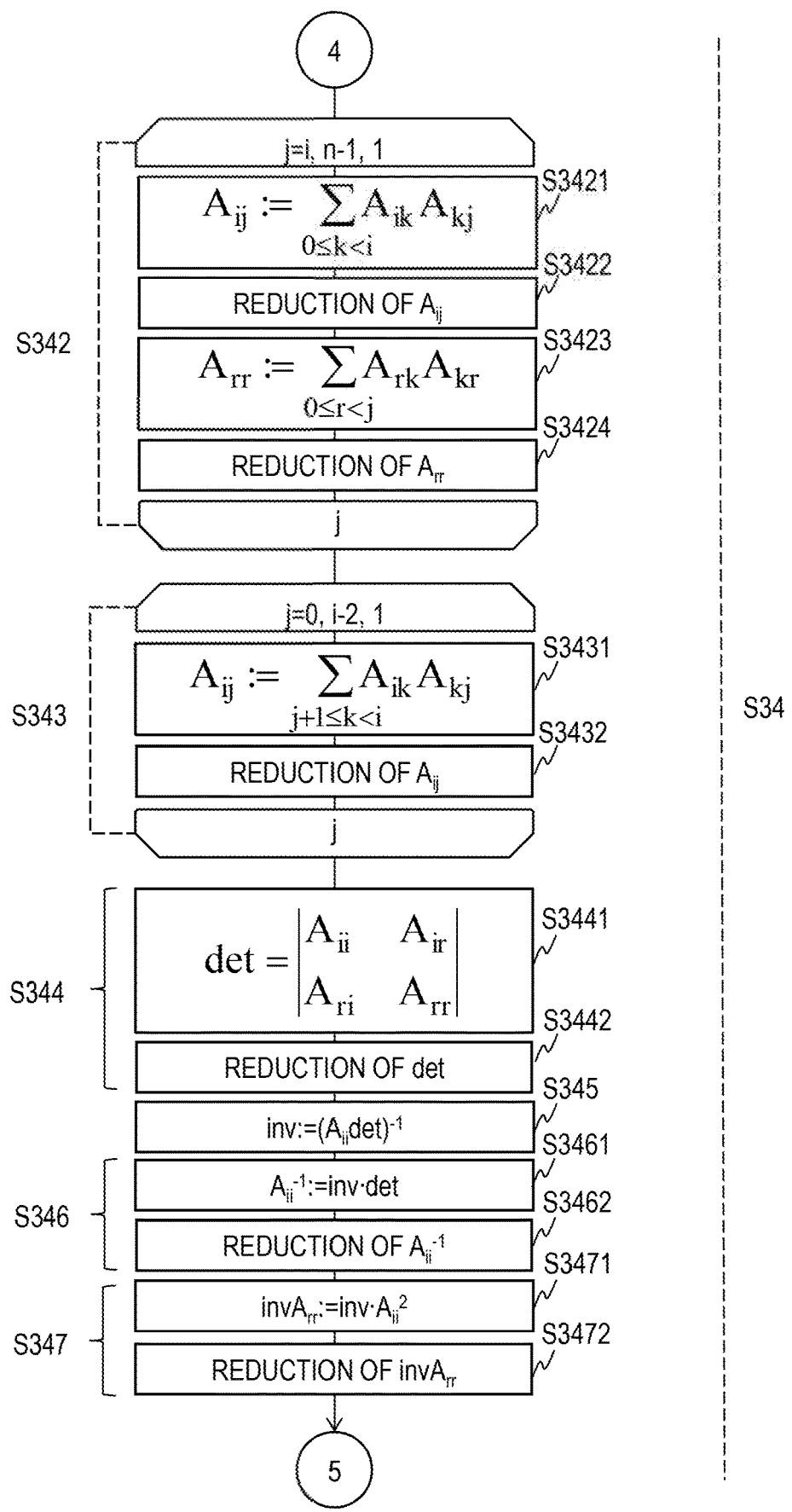
FIG. 6 is a flow diagram illustrating processing by the matrix triangulation apparatus according to the embodiment.
Figure 7:
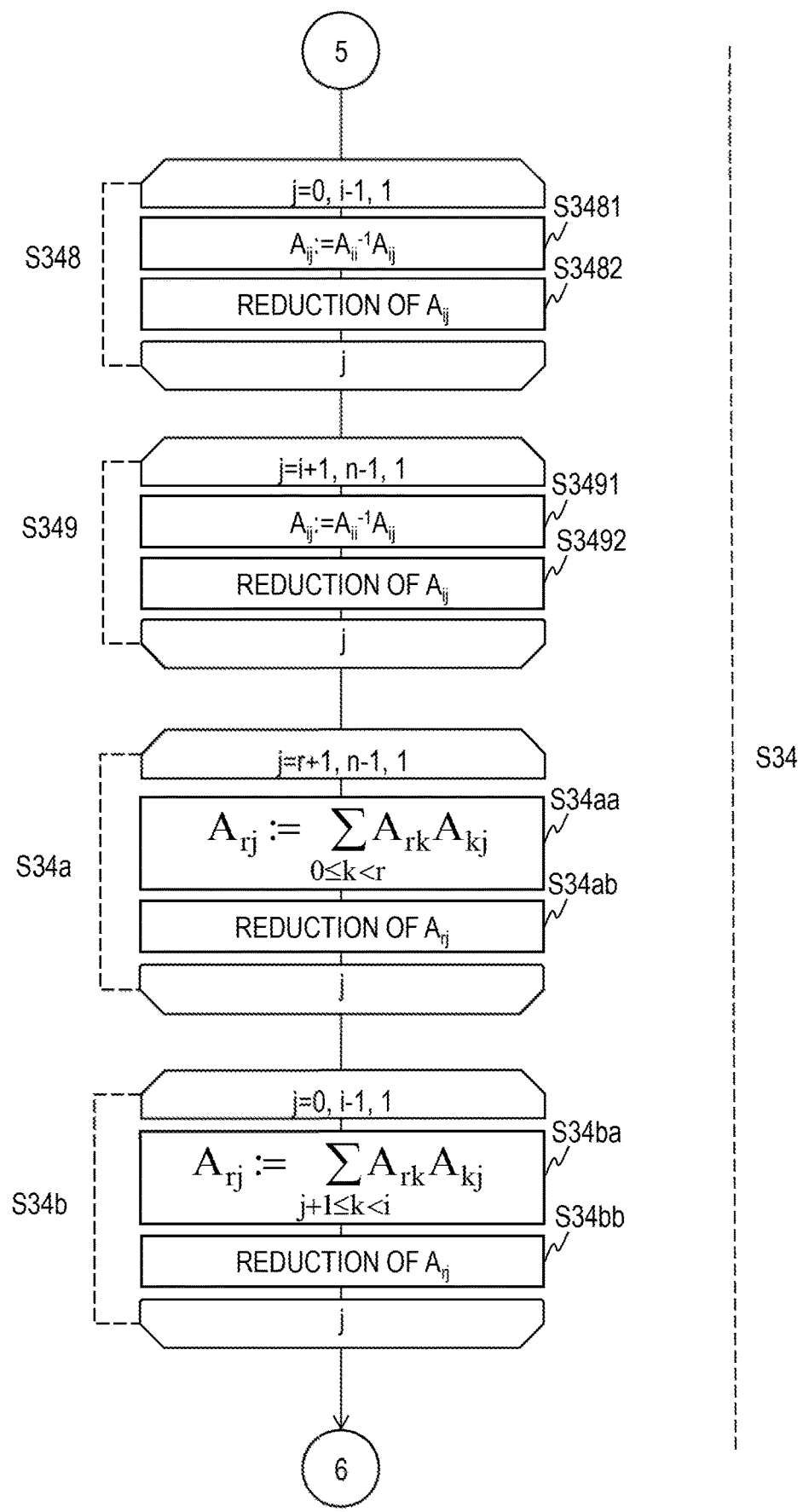
FIG. 7 is a flow diagram illustrating processing by the matrix triangulation apparatus according to the embodiment.
Figure 8:
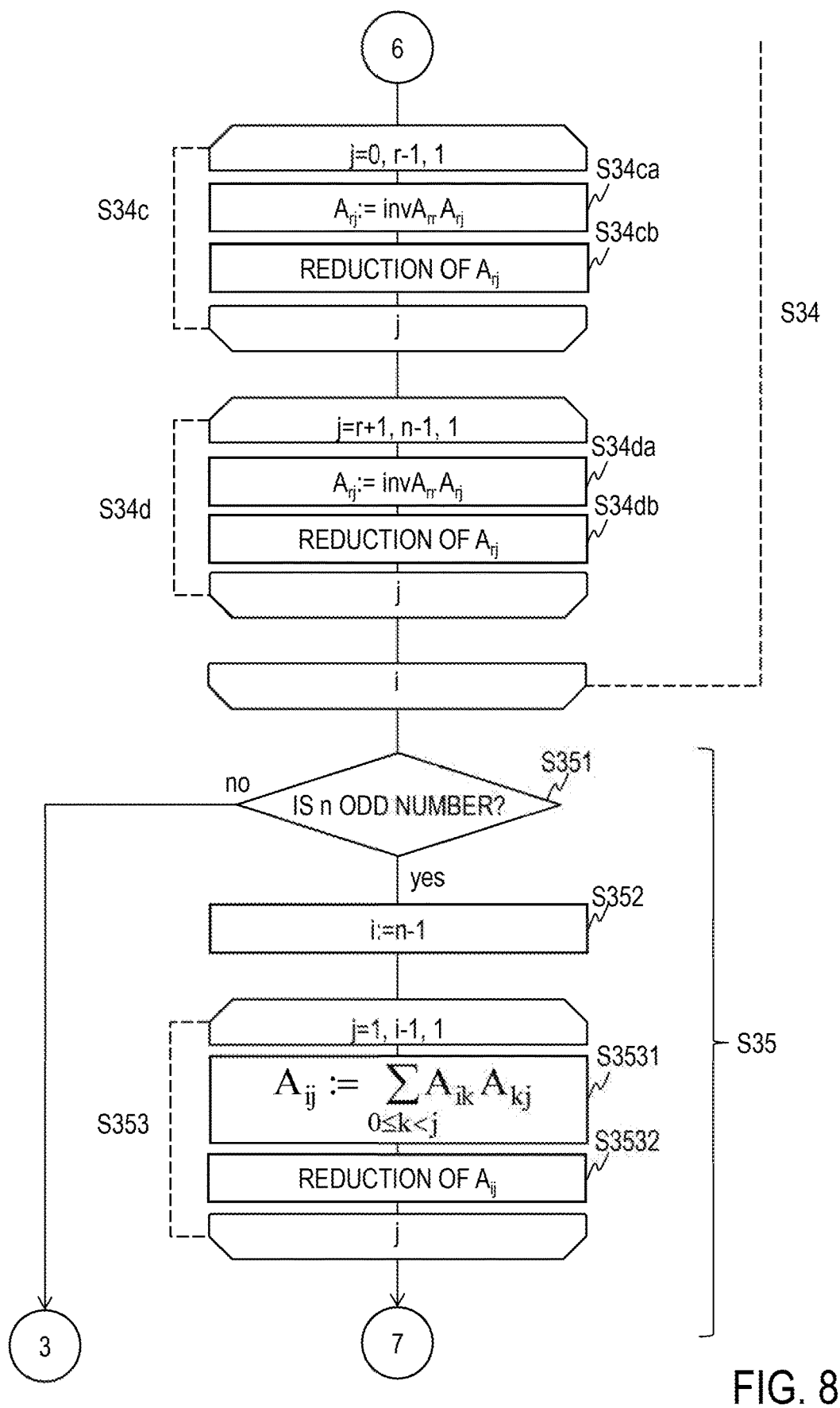
FIG. 8 is a flow diagram illustrating processing by the matrix triangulation apparatus according to the embodiment.
Figure 9:
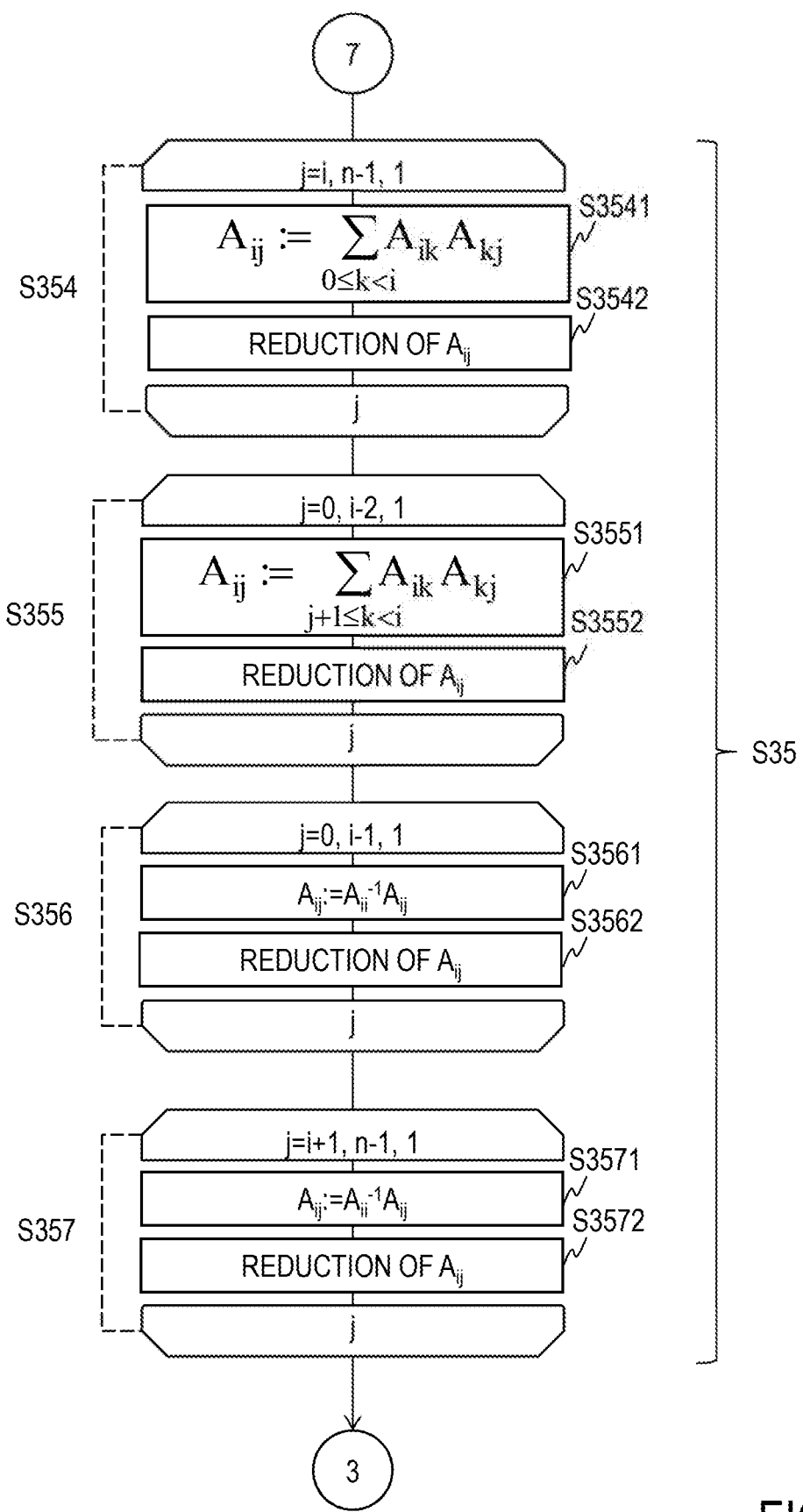
FIG. 9 is a flow diagram illustrating processing by the matrix triangulation apparatus according to the embodiment.

A first embodiment will be described.
<Configuration>
As illustrated in FIG. 1, a matrix triangulation apparatus 1 according to this embodiment includes an input unit 11, an output unit 12, a storage 13, a controller 14, a product-sum arithmetic unit 15, an inverse element arithmetic unit 16, a multiplicator 17, and a reduction unit 18. The matrix triangulation apparatus in this embodiment is an apparatus configured via execution of a predetermined program by a general- or special-purpose computer including a processor (a hardware processor) such as a central processing unit (CPU) and memories such as random-access memory (RAM) and read-only memory (ROM), for example. The computer may have a single processor and memory or more than one processor and memory. The program may be installed in the computer or prestored in the ROM or the like. Also, rather than using an electronic circuit (circuitry) that implements functionality by reading a program like a CPU, an electronic circuit that implements processing functions without using programs may be used to configure some or all of the functional units. Also, an electronic circuit constituting a single apparatus may include multiple CPUs. Data input to the input unit 11 and data produced by other units are stored in the storage 13 and read out from it as required. The matrix triangulation apparatus 1 executes various kinds of processing under control of the controller 14.
<Processing>
Using FIGS. 2 to 4, processing performed in this embodiment will be described.
<<Step S11>>
An n×n square matrix A (a first square matrix) whose entries are the elements of a finite field (for example, a prime field with an order of 2 or an extension field over that prime field as the basic field) is input to the input unit 11 of the matrix triangulation apparatus 1 and stored in the storage 13. Hereinbelow, an entry in row i and column j of the square matrix A will be denoted as $A_{ij}$. Here, n is an integer equal to or greater than 4 and i=0, ..., n−1 and j=0, ..., n−1 hold.

<<Step S12>>

The inverse element arithmetic unit 16 takes $A_{00}$ as input and obtains $A_{00}:=A_{00}^{-1}$, where β1:=β2 means setting β2 as β1 (that is, assigning β2 to β1).

<<Step S13>>

In the loop at step S13, the following steps S131 and S132 are executed while incrementing j by 1 starting from 1 for j=1, ..., n−1.

The multiplicator 17 takes $A_{00}$ and $A_{0j}$ as input and obtains $A_{0j}:=A_{00} A_{0j}$ (step S131). The reduction unit 18 takes $A_{0j}$ obtained at step S131 as input, performs reduction of $A_{0j}$, and updates entry $A_{0j}$ to the result of the reduction (step S132).

<<Step S14>>

In the loop at step S14, the following steps S141 to S146 are executed while incrementing i by 1 starting from 1 for each of i=, ..., n−1.

[Step S141]

In the loop at step S141, the following steps S1411 and S1412 are executed while incrementing j by 1 starting from 1 for j=1, ..., i−1. When j is not present, step S141 is not executed (this applies to the other loops as well).

The product-sum arithmetic unit 15 takes $A_{ik}$ and $A_{kj}$ as input, and obtains $$A_{ij} := \sum_{0 \le k < j} A_{ik} A_{kj}.$$

That is, the product-sum arithmetic unit 15 performs product-sum operation on entries $A_{ik}$ and $A_{kj}$ at multiple positions in the matrix as operands to obtain the product-sum operation result $A_{ij}$ corresponding to an entry at a different position than the operands $A_{ik}$ and $A_{kj}$ (step S1411). The reduction unit 18 performs reduction of $A_{ij}$ obtained at step S1411 and updates entry $A_{ij}$ to the result of the reduction (step S1412).

[Step S142]

In the loop at step S142, the following steps S1421 and S1422 are executed while incrementing j by 1 starting from 1 for j=1, ..., n−1.

The product-sum arithmetic unit 15 takes $A_{ik}$ and $A_{kj}$ as input and obtains $$A_{ij} := \sum_{0 \le k < i} A_{ik} A_{kj}.$$

Here again, the product-sum arithmetic unit 15 performs product-sum operation on entries $A_{ik}$ and $A_{kj}$ at multiple positions in the matrix as operands to obtain the product-sum operation result $A_{ij}$ corresponding to an entry at a different position than the operands $A_{ik}$ and $A_{kj}$ (step S1421). The reduction unit 18 performs reduction of $A_{ij}$ obtained at step S1421 and updates entry $A_{ij}$ to the result of the reduction (step S1422).

[Step S143]

In the loop at step S143, the following steps S1431 and S1432 are executed while incrementing j by 1 starting from 0 for j=0, ..., i−2.

The product-sum arithmetic unit 15 takes $A_{ik}$ and $A_{kj}$ as input and obtains $$A_{ij} := \sum_{j+1 \le k < i} A_{ik} A_{kj}.$$

Here again, the product-sum arithmetic unit 15 performs product-sum operation on entries $A_{ik}$ and $A_{kj}$ at multiple positions in the matrix as operands to obtain the product-sum operation result $A_{ij}$ corresponding to an entry at a different position than the operands $A_{ik}$ and $A_{kj}$ (step S1431). The reduction unit 18 performs reduction of $A_{ij}$ obtained at step S1431 and updates entry $A_{ij}$ to the result of the reduction (step S1432).

[Step S144]

At step S144, the inverse element arithmetic unit 16 takes $A_{ii}$ as input and obtains $A_{ii}:=A_{ii}^{-1}$ (step S144).

[Step S145]

In the loop at step S145, the following steps S1451 and S1452 are executed while incrementing j by 1 starting from 0 for j=0, ..., i−1.

The multiplicator 17 takes $A_{ii}$ and $A_{ij}$ as input and obtains $A_{ij}:=A_{ii}A_{ij}$ (step S1451). The reduction unit 18 performs reduction of $A_{ij}$ obtained at step S1451 and updates entry $A_{ij}$ to the result of the reduction (step S1452).

[Step S146]

In the loop at step S146, the following steps S1461 and S1462 are executed while incrementing j by 1 starting from i+1 for j=i+1, ..., n−1.

The multiplicator 17 takes $A_{ii}$ and $A_{ij}$ as input and obtains $A_{ij}:=A_{ii}A_{ij}$ (step S461). The reduction unit 18 performs reduction of $A_{ij}$ obtained at step S1461 and updates entry $A_{ij}$ to the result of the reduction (step S1462).

<<Step S15>>

After the aforementioned loop at step S14, the loop at step S15 is executed. In the loop at step S15, step S151 is executed for the row i∈(0, ..., n−1) which is required as output. The row i required as output may be all of the entries in {0, ..., n−1} or some of them (for example, entries with i=n−1).

[Step S151]

In the loop at step S151, the following steps S1511 and S1512 are executed while incrementing j by 1 starting from 0 for j=0, ..., i−1.

The multiplicator 17 takes $A_{jj}$ and $A_{ij}$ as input and obtains $A_{ij}:=A_{jj}A_{ij}$ (step S151). The reduction unit 18 performs reduction of $A_{ij}$ obtained at step S1511 and updates entry $A_{ij}$ to the result of the reduction (step S1512).

<<Step S16>>

The output unit 12 outputs an n×n square matrix B (a second square matrix) formed from entries $A_{ij}$ (where i=0, ..., n−1 and j=0, ..., n−1) obtained as described above. For example, if the loop at step S15 is executed for all of i=0, ..., n−1, B will be formed from the lower triangular portion of an n×n lower triangular matrix L satisfying LA=A' and the upper triangular portion of an n×n upper triangular matrix A' (that is, B=L+A'). In this embodiment, calculations are performed by assigning the entries in the lower triangular portion of the lower triangular matrix L to entries that become zero during the process of triangulation of the square matrix A. That is to say, calculations are performed by assigning the operation results at steps S1411, S1431, and S451, which correspond to the entries in the lower triangular portion of the lower triangular matrix L, to entries $A_{ij}$ that become zero during the process of triangulation of the square matrix A. Accordingly, this embodiment does not require a storage area for exclusively storing entries in the lower triangular portion of the lower triangular matrix L, for example, the operation results at steps S1411, S1431, and S1451.

Second Embodiment

The inverse element operation in the processing described in the first embodiment may be performed more efficiently via the aforementioned "streamlining 2 of inverse elements" or "streamlining 3 of inverse elements". The following description will focus on differences from matters described so far and use the same reference characters to refer to matters already described for the sake of simplicity.

<Configuration>

As illustrated in FIG. 1, a matrix triangulation apparatus 2 according to this embodiment includes an input unit 1, an output unit 12, a storage 13, a controller 14, a product-sum arithmetic unit 15, an inverse element arithmetic unit 26, a multiplicator 17, and a reduction unit 18.

<Processing>

The second embodiment differs from the first embodiment only in that step S12 is replaced with step S22 and step S144 is replaced with step S244. Assume that $A_{00}^{-1}$ and $A_{ii}^{-1}$ at steps S22 and S244 can be represented as $A_{00}^{-1}=x^{-\alpha 1}$ and $A_{ii}^{-1}=x^{-\alpha 2}$, respectively. Here, $\alpha 1$ and $\alpha 2$ are positive integers satisfying $1 \le \alpha 1 \le c$ and $1 \le \alpha 2 \le c$, respectively. In this case, the inverse element arithmetic unit 26 calculates $A_{00}^{-1}$ by multiplication $x^{-c}x^{c-\alpha 1}$ using inverse element $x^{-c}$ calculated in advance (step S22), and calculates $A_{ii}^{-1}$ by multiplication $x^{-c}x^{c-\alpha 2}$ (step S244). Alternatively, the inverse element arithmetic unit 26 may make reference to $x^{-\alpha}$ calculated in advance for $\alpha=1, 2, \ldots, c$ to obtain $x^{-\alpha 1}$ as $A_{00}^{-1}$ (step S22), and obtain $x^{-\alpha 2}$ as $A_{ii}^{-1}$ (step S244). The second embodiment is otherwise the same as the first embodiment.

Third Embodiment

The inverse element operation in the processing described in the first embodiment may be performed more efficiently via the aforementioned "streamlining 1 of inverse elements". This embodiment will illustrate this in detail.

<Configuration>

As illustrated in FIG. 1, a matrix triangulation apparatus 3 according to this embodiment includes an input unit 11, an output unit 12, a storage 13, a controller 14, a product-sum arithmetic unit 35, an inverse element arithmetic unit 36, a multiplicator 37, and a reduction unit 38.

<Processing>

Using FIGS. 5 to 9, processing performed in this embodiment will be described.

After the execution of steps S11, S12 (or S22), and S13 described above, the following step S34 is executed.

<<Step S34>>

In the loop at step S34, the following steps S340 to S349 and S34a to S34d are executed while incrementing i by 2 starting from 1 for $i=1, \ldots, n-1$ (that is, for odd-numbered i).

[Step S340]

At step S340, the controller 14 obtains $r:=i+1$ (step S340).

[Step S341]

In the loop at step S341, the following steps S3411, S3412, and S3413 are executed while incrementing j by 1 starting from 1 for $j=1, \ldots, i-1$.

The product-sum arithmetic unit 35 takes $A_{ik}$ and $A_{kj}$ as input and obtains $$A_{ij} := \sum_{0 \le k < j} A_{ik} A_{kj}$$

(step S3411). The reduction unit 38 performs reduction of $A_{ij}$ obtained at step S3411 and updates entry $A_{ij}$ to the result of the reduction (step S3412).

In the loop at step S3413, the following steps S3413a and S3413b are executed while incrementing j' by 1 starting from 1 for $j'=1, \ldots, r-1$.

The product-sum arithmetic unit 35 takes $A_{rk}$ and $A_{kj'}$ as input and obtains $$A_{rj'} := \sum_{0 \le k < j'} A_{rk} A_{kj'}$$

(step S3413a). The reduction unit 38 performs reduction of $A_{rj'}$ obtained at step S3413a and updates entry $A_{rj'}$ to the result of the reduction (step S3413b).

[Step S342]

In the loop at step S342, the following steps S3421, S3422, S3423, and S3424 are executed while incrementing j by 1 starting from i for $j=i, \ldots, n-1$.

The product-sum arithmetic unit 35 takes $A_{ik}$ and $A_{kj}$ as input and obtains $$A_{ij} := \sum_{0 \le k < i} A_{ik} A_{kj}$$

(step S3421). The reduction unit 38 performs reduction of $A_{ij}$ obtained at step S3421 and updates entry $A_{ij}$ to the result of the reduction (step S3422). The product-sum arithmetic unit 35 takes $A_{rk}$ and $A_{kr}$ as input and obtains $$A_{rr} := \sum_{0 \le r < i} A_{rk} A_{kr}$$

(step S3423). The reduction unit 38 performs reduction of $A_{rr}$ obtained at step S3423 and updates entry $A_{rr}$ to the result of the reduction (step S3424).

[Step S343]

In the loop at step S343, the following steps S3431 and S3432 are executed while incrementing j by 1 starting from 0 for $j=0, \ldots, i-2$.

The product-sum arithmetic unit 35 takes $A_{ik}$ and $A_{kj}$ as input and obtains $$A_{ij} := \sum_{j+1 \le k < i} A_{ik} A_{kj}$$

(step S3431). The reduction unit 38 performs reduction of $A_{ij}$ obtained at step S3431 and updates entry $A_{ij}$ to the result of the reduction (step S3432).

[Step S344]

The inverse element arithmetic unit 36 takes $A_{ii}$, $A_{ir}$, $A_{ri}$, and $A_{rr}$ as input and obtains a determinant $$det = \begin{vmatrix} A_{ii} & A_{ir} \\ A_{ri} & A_{rr} \end{vmatrix}$$

(step S3441). The reduction unit 38 performs reduction of the determinant det obtained at step S3441 (step S3442).

[Step S345]

The inverse element arithmetic unit 36 takes $A_{ii}$ and det as input and obtains $inv := (A_{ii} det)^{-1}$ (step S345).

[Step S346]

The inverse element arithmetic unit 36 takes inv and det as input and obtains $A_{ii}^{-1} := inv \cdot det$ (step S3461). The reduction unit 38 performs reduction of $A_{ii}^{-1}$ obtained at step S3461 (step S3462).

[Step S347]

The inverse element arithmetic unit 36 takes inv and $A_{ii}$ as input and obtains $invA_{rr} := inv \cdot A_{ii}^2$ (step S3471). The reduction unit 38 performs reduction of $invA_{rr}$ obtained at step S3471 (step S3472).

[Step S348]

In the loop at step S348, the following steps S3481 and S3482 are executed while incrementing j by 1 starting from 0 for $j=0, \ldots, i-1$.

The multiplicator 37 takes $A_{ii}$ and $A_{ij}$ as input and obtains $A_{ij} := A_{ii}^{-1} A_{ij}$ (step S3481). The reduction unit 38 performs reduction of $A_{ij}$ obtained at step S3481 and updates entry $A_{ij}$ to the result of the reduction (step S3482).

[Step S349]

In the loop at step S349, the following steps S3491 and S3492 are executed while incrementing j by 1 starting from i+1 for $j=i+1, \ldots, n-1$.

The multiplicator 37 takes $A_{ii}^{-1}$ and $A_{ij}$ as input and obtains $A_{ij} := A_{ii}^{-1} A_{ij}$ (step S3491). The reduction unit 38 performs reduction of $A_{ij}$ obtained at step S3491 and updates entry $A_{ij}$ to the result of the reduction (step S3492).

[Step S34a]

In the loop at step S34a, the following steps S34aa and S34ab are executed while incrementing j by 1 starting from r+1 for $j=r+1, \ldots, n-1$.

The product-sum arithmetic unit 35 takes $A_{rk}$ and $A_{kj}$ as input and obtains $$A_{rj} := \sum_{0 \le k < r} A_{rk} A_{kj}$$

(step S34aa). The reduction unit 38 performs reduction of $A_{rj}$ obtained at step S34aa and updates entry $A_{rj}$ to the result of the reduction (step S34ab).

[Step S34b]

In the loop at step S34b, the following steps S34ba and S34bb are executed while incrementing j by 1 starting from 0 for $j=0, \ldots, i-1$.

The product-sum arithmetic unit 35 takes $A_{rk}$ and $A_{kj}$ as input and obtains $$A_{rj} := \sum_{j+1 \le k < i} A_{rk} A_{kj}$$

(step S34ba). The reduction unit 38 performs reduction of $A_{rj}$ obtained at step S34ba and updates entry $A_{rj}$ to the result of the reduction (step S34bb).

[Step S34c]

In the loop at step S34c, the following steps S34ca and S34cb are executed while incrementing j by 1 starting from 0 for $j=0, \ldots, r-1$.

The multiplicator 37 takes $invA_{rr}$ and $A_{rj}$ as input and obtains $A_{rj} := invA_{rr} A_{rj}$ (step S34ca). The reduction unit 38 performs reduction of $A_{rj}$ obtained at step S34ca and updates entry $A_{rj}$ to the result of the reduction (step S34cb).

[Step S34d]

In the loop at step S34d, the following steps S34da and S34db are executed while incrementing j by 1 starting from r+ for $j=r+1, \ldots, n-1$.

The multiplicator 37 takes $invA_{rr}$ and $A_{rj}$ as input and obtains $A_{rj} := invA_{rr} A_{rj}$ (step S34da). The reduction unit 38 performs reduction of $A_{rj}$ obtained at step S34da and updates entry $A_{rj}$ to the result of the reduction (step S34db).

<<Step S35>>

The controller 14 determines whether n is an odd number or not (step S351). If n is an even number, the flow proceeds to the step S15 described above. On the other hand, if n is an odd number, the following steps S352 to S357 are executed before proceeding to the step S15 described above.

[Step S352]

The controller 14 obtains $i := n-1$ (step S352).

[Step S353]

In the loop at step S353, the following steps S3531 and S3532 are executed while incrementing j by 1 starting from 1 for $j=1, \ldots, i-1$.

The product-sum arithmetic unit 35 takes $A_{ik}$ and $A_{kj}$ as input and obtains $$A_{ij} := \sum_{0 \le k < j} A_{ik} A_{kj}$$

(step S3531). The reduction unit 18 performs reduction of $A_{ij}$ obtained at step S3531 and updates entry $A_{ij}$ to the result of the reduction (step S3532).

[Step S354]

In the loop at step S354, the following steps S3541 and S3542 are executed while incrementing j by 1 starting from i for $j=i, \ldots, n-1$.

The product-sum arithmetic unit 35 takes $A_{ik}$ and $A_{kj}$ as input and obtains $$A_{ij} := \sum_{0 \le k < i} A_{ik} A_{kj}$$

(step S3541). The reduction unit 18 performs reduction of $A_{ij}$ obtained at step S3541 and updates entry $A_{ij}$ to the result of the reduction (step S3542).

[Step S355]

In the loop at step S355, the following steps S3551 and S3552 are executed while incrementing j by 1 starting from 0 for $j=0, \ldots, i-2$.

The product-sum arithmetic unit 35 takes $A_{ik}$ and $A_{kj}$ as input and obtains $$A_{ij} := \sum_{j+1 \le k < i} A_{ik} A_{kj}$$

(step S3551). The reduction unit 18 performs reduction of $A_{ij}$ obtained at step S3551 and updates entry $A_{ij}$ to the result of the reduction (step S3552).

[Step S356]

In the loop at step S356, the following steps S3561 and S3562 are executed while incrementing j by 1 starting from 0 for j=0, . . . , i−1.

The multiplicator 37 obtains $A_{ij} := A_{ii}^{-1} A_{ij}$ (step S3561). The reduction unit 18 performs reduction of $A_{ij}$ obtained at step S3561 and updates entry $A_{ij}$ to the result of the reduction (step S3562).

[Step S357]

In the loop at step S357, the following steps S3571 and S3572 are executed while incrementing j by 1 starting from j+1 for j=j+1, . . . , n−1.

The multiplicator 37 obtains $A_{ij} := A_{ii}^{-1} A_{ij}$ (step S3571). The reduction unit 18 performs reduction of $A_{ij}$ obtained at step S3571 and updates entry $A_{ij}$ to the result of the reduction (step S3572).

Fourth Embodiment

In the first to third embodiments described above, u-row and v-column entries of an n×n square matrix L with $L_{uv} = A_{uv}$ instead of $A_{uv}$ satisfying u≥v obtained by the arithmetic units, may be obtained, and operation using $L_{uv}$ instead of $A_{uv}$ obtained by the arithmetic units may be performed. In the following, an example of obtaining u-row and v-column entries of an n×n square matrix L satisfying $L_{uv} = A_{uv}$ instead of $A_{uv}$ satisfying u≥v obtained by the arithmetic units in the first embodiment will be described.

<Configuration>

As illustrated in FIG. 1, a matrix triangulation apparatus 4 according to this embodiment includes an input unit 11, an output unit 12, a storage 13, a controller 14, a product-sum arithmetic unit 45, an inverse element arithmetic unit 46, a multiplicator 47, and a reduction unit 48.

<Processing>

Figure 10:
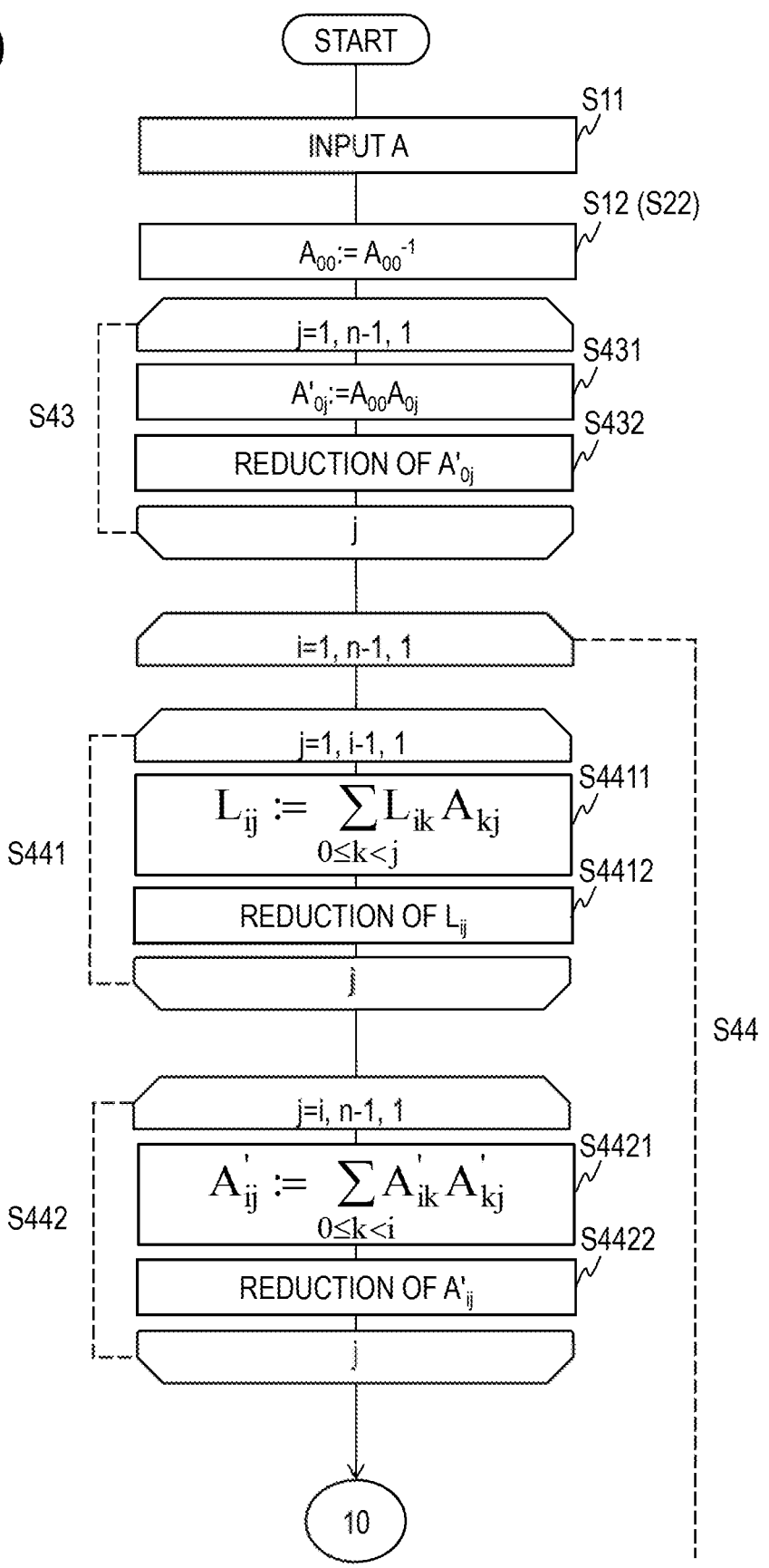
FIG. 10 is a flow diagram illustrating processing by the matrix triangulation apparatus according to an embodiment.
Figure 11:
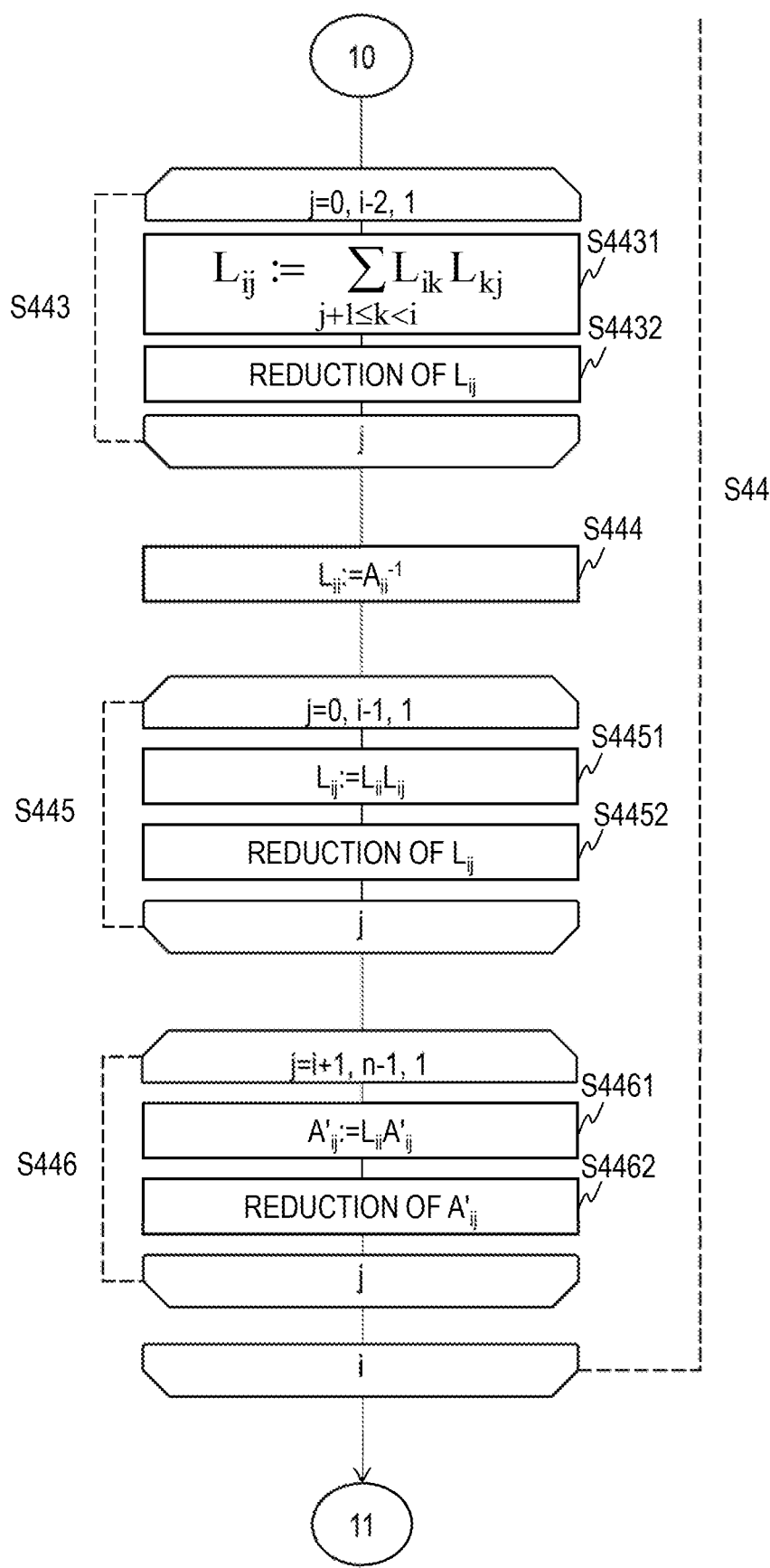
FIG. 11 is a flow diagram illustrating processing by the matrix triangulation apparatus according to the embodiment.
Figure 12:
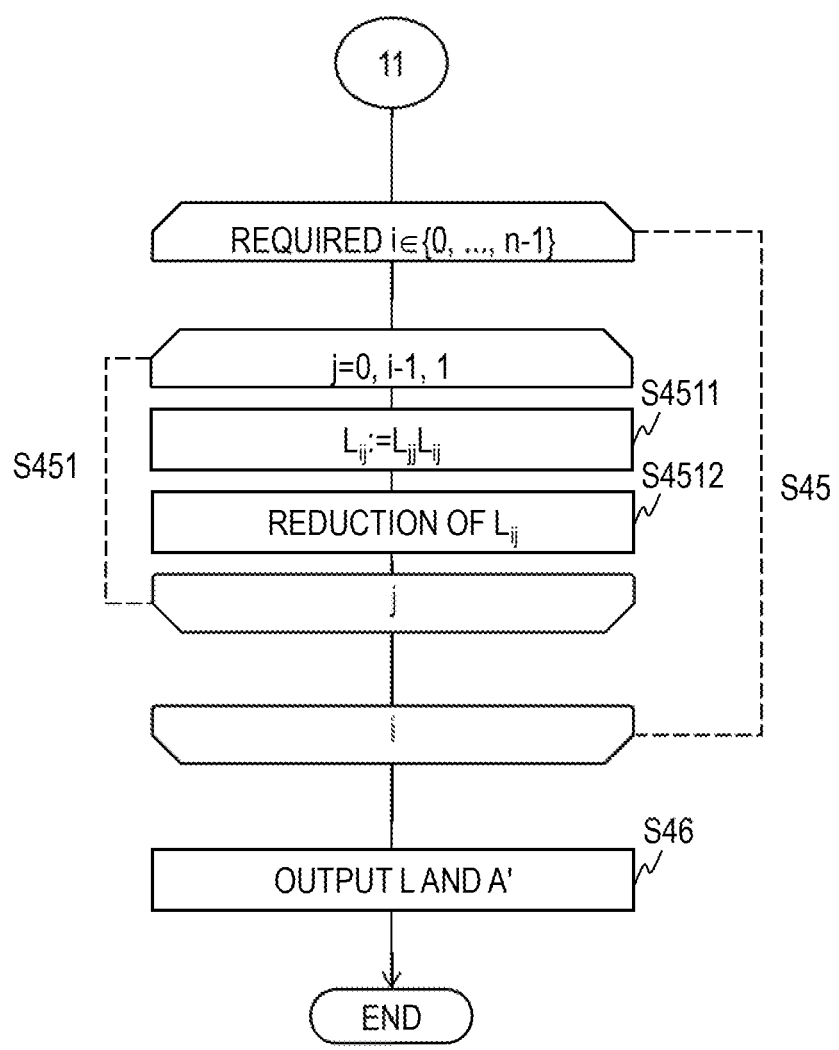
FIG. 12 is a flow diagram illustrating processing by the matrix triangulation apparatus according to the embodiment.

Using FIGS. 10 to 12, processing performed in this embodiment will be described.

After the execution of steps S11 and S12 (or S22) described above, the following step S43 is executed.

<<Step S43>>

In the loop at step S43, the following steps S431 and S432 are executed while incrementing j by 1 starting from 1 for j=1, . . . , n−1.

The multiplicator 47 takes $A_{00}$ and $A_{0j}$ as input and obtains $A'_{0j} := A_{00} A_{0j}$ (step S4311). The reduction unit 18 takes $A'_{0j}$ obtained at step S431 as input, performs reduction of $A'_{0j}$, and updates entry $A'_{0j}$ to the result of the reduction (step S432).

<<Step S44>>

In the loop at step S44, the following steps S441 to S446 are executed while incrementing i by 1 starting from 1 for each of i=1, . . . , n−1.

[Step S441]

In the loop at step S441, the following steps S4411 and S4412 are executed while incrementing j by 1 starting from 1 for j=1, . . . , i−1.

The product-sum arithmetic unit 45 takes $L_{ik}$ and $A_{kj}$ as input and obtains $$L_{ij} := \sum_{0 \leq k < j} L_{ik} A_{kj}.$$

Here, $L_{ik} = A_{ik}$ holds when the operand $L_{ik}$ has not been obtained. That is, product-sum operation is performed on entries $L_{ik}$ and $A_{kj}$ at multiple positions in the matrix as operands to obtain the product-sum operation result $L_{ij}$ corresponding to an entry at a different position than the operands $L_{ik}$ and $A_{kj}$ (step S4411). The reduction unit 18 performs reduction of $L_{ij}$ obtained at step S4411 and updates entry $L_{ij}$ to the result of the reduction (step S4412).

[Step S442]

In the loop at step S442, the following steps S4411 and S4412 are executed while incrementing j by 1 starting from 1 for j=1, . . . , n−1.

The product-sum arithmetic unit 45 takes $A'_{ik}$ and $A'_{kj}$ as input and obtains $$A'_{ij} := \sum_{0 \leq k < i} A'_{ik} A'_{kj}.$$

Here, $A'_{ik} = A_{ik}$ holds when the operand $A'_{ik}$ has not been obtained, and $A'_{kj} = A_{kj}$ holds when $A'_{kj}$ has not been obtained. Here again, the product-sum arithmetic unit 45 performs product-sum operation on entries $A_{ik}$ and $A'_{kj}$ at multiple positions in the matrix as operands to obtain the product-sum operation result $A'_{ij}$ corresponding to an entry at a different position than the operands $A'_{ik}$ and $A'_{kj}$ (step S4421). The reduction unit 18 performs reduction of $A'_{ij}$ obtained at step S4421 and updates entry $A'_{ij}$ to the result of the reduction (step S4422).

[Step S443]

In the loop at step S443, the following steps S4431 and S4432 are executed while incrementing j by 1 starting from 0 for j=0, . . . , i−2.

The product-sum arithmetic unit 45 takes $L_{ik}$ and $L_{kj}$ as input and obtains $$L_{ij} := \sum_{j+1 \leq k < i} L_{ik} L_{kj}.$$

Here, $L_{ik} = A_{ik}$ holds when the operand $L_{ik}$ has not been obtained, and $L_{kj} = A_{kj}$ holds when $L_{kj}$ has not been obtained. Here again, the product-sum arithmetic unit 45 performs product-sum operation on entries $L_{ik}$ and $L_{kj}$ at multiple positions in the matrix as operands to obtain the product-sum operation result $L_{ij}$ corresponding to an entry at a different position than the operands $L_{ik}$ and $L_{kj}$ (step S4431). The reduction unit 18 performs reduction of $L_{ij}$ obtained at step S4431 and updates entry $L_{ij}$ to the result of the reduction (step S4432).

[Step S444]

At step S444, the inverse element arithmetic unit 46 takes $A_{ii}$ as input and obtains $L_{ii} := A_{ii}^{-1}$ (step S444).

[Step S445]

In the loop at step S445, the following steps S4451 and S4452 are executed while incrementing j by 1 starting from 0 for j=0, . . . , i−1.

The multiplicator 47 takes $L_{ii}$ and $L_{ij}$ as input and obtains $L_{ij} := L_{ii} L_{ij}$ (step S4451). The reduction unit 18 performs reduction of $L_{ij}$ obtained at step S4451 and updates entry $L_{ij}$ to the result of the reduction (step S4452).

[Step S446]

In the loop at step S446, the following steps S4461 and S4462 are executed while incrementing j by 1 starting from j+1 for j=j+1, . . . , n−1.

The multiplicator 47 takes $L_{ii}$ and $A'_{ij}$ as input and obtains $A'_{ij} := L_{ii} A'_{ij}$ (step S4461). The reduction unit 18 performs reduction of $A'_{ij}$ obtained at step S4461 and updates entry $A'_{ij}$ to the result of the reduction (step S4462).

<<Step S45>>

After the aforementioned loop at step S44, the loop at step S45 is executed. In the loop at step S45, step S451 is executed for the row $i \in (0, \ldots, n-1)$ which is required as output. The row i required as output may be all of the entries in $\{0, \ldots, n-1\}$ or some of them.

[Step S451]

In the loop at step S451, the following steps S4511 and S4512 are executed while incrementing j by 1 starting from 0 for $j=0, \ldots, i-1$.

The multiplicator 47 takes $L_{jj}$ and $L_{ij}$ as input and obtains $L_{ij} := L_{jj} L_{ij}$ (step S4511). The reduction unit 18 performs reduction of $L_{ij}$ obtained at step S4511 and updates entry $L_{ij}$ to the result of the reduction (step S4512).

<<Step S46>>

The output unit 12 outputs an n×n square matrix L formed from entries $L_{ij}$ obtained as described above (where $i=0, \ldots, n-1$ and $j=0, \ldots, n-1$) and an n×n square matrix $A'$ formed from entries $A'_{ij}$ (where $i=0, \ldots, n-1$ and $j=0, \ldots, n-1$). For example, if the loop at step S45 is executed for all of $i=0, \ldots, n-1$, the square matrices L and $A'$ will respectively be an n×n lower triangular matrix L and an n×n upper triangular matrix $A'$, satisfying $LA=A'$. Unlike the first and third embodiments, this embodiment requires storage area for storing entries of the lower triangular portion of the lower triangular matrix L.

<Specific Example of Output Log>

An exemplary output log is shown below. In the example below, a cubic extension field of 2 having a prime field with an order of 2 as the basic field is used as the finite field; $x^3+x+1$ is used as the irreducible polynomial for reduction; n=4 holds; and recursive processing equivalent to the aforementioned step S15 is executed only for i=3. Note that matrix entries are expressed by decimal numbers below. The value of each entry is converted to a binary number, the value $\eta_M \in \{0, 1\}$ at the Mth digit (the place of $2^{M-1}$) thereof is used as the coefficient for the M−1th order term of the polynomial, and the polynomial after reduction with $x^3=x+1$ corresponds to an element of the extension field.

<<Input matrix>>

1 1 1 1
1 2 4 8
1 4 16 64
1 8 64 512

<<Exemplary output log in the first embodiment>>

0: input 1, 1, 1, 1,
1, 2, 4, 3,
1, 4, 6, 5,
1, 3, 5, 4,
1: after processing of the 0th row 1, 1, 1, 1,
1, 2, 4, 3,
1, 4, 6, 5,
1, 3, 5, 4,
2: the left side for the ith row 1, 1, 1, 1,
1, 2, 4, 3, -continued 1, 4, 6, 5,
1, 3, 5, 4,
3: the diagonal entry and right side for the ith row 1, 1, 1, 1,
1, 3, 5, 2,
1, 4, 6, 5,
1, 3, 5, 4,
4: calculate the lower triangular portion for the ith row 1, 1, 1, 1,
1, 3, 5, 2,
1, 4, 6, 5,
1, 3, 5, 4,
5: multiply by the inverse element of the diagonal component for the ith row 1, 1, 1, 1,
6, 6, 3, 7,
1, 4, 6, 5,
1, 3, 5, 4,
6: the left side for the ith row 1, 1, 1, 1,
6, 6, 3, 7,
1, 5, 6, 5,
1, 3, 5, 4,
7: the diagonal entry and right side for the ith row 1, 1, 1, 1,
6, 6, 3, 7,
1, 5, 3, 2,
1, 3, 5, 4,
8: calculate the lower triangular portion for the ith row 1, 1, 1, 1,
6, 6, 3, 7,
2, 5, 3, 2,
1, 3, 5, 4,
9: multiply by the inverse element of the diagonal component for the ith row 1, 1, 1, 1,
6, 6, 3, 7,
7, 3, 6, 7,
1, 3, 5, 4,
10: the left side for the ith row 1, 1, 1, 1,
6, 6, 3, 7,
7, 3, 6, 7,
1, 2, 2, 4,
11: the diagonal entry and right side for the ith row 1, 1, 1, 1,
6, 6, 3, 7,
7, 3, 6, 7,
1, 2, 2, 5,
12: calculate the lower triangular portion for the ith row 1, 1, 1, 1,
6, 6, 3, 7,
7, 3, 6, 7,
3, 4, 2, 5,
13: multiply by the inverse element of the diagonal component for the ith row 1, 1, 1, 1,
6, 6, 3, 7,
7, 3, 6, 7,
6, 3, 4, 2,
14: calculate the last row 1, 1, 1, 1,
6, 6, 3, 7,
7, 3, 6, 7,
6, 3, 4, 2, -continued 15: multiply the diagonal component for the last row 1, 1, 1, 1,
6, 6, 3, 7,
7, 3, 6, 7,
6, 1, 5, 2,
16: output (basic)

1, 1, 1, 1,
6, 6, 3, 7,
7, 3, 6, 7,
6, 1, 5, 2,

<<Exemplary output log in the third embodiment>>

17: after processing of the 0th row 1, 1, 1, 1,
1, 2, 4, 3,
1, 4, 6, 5,
1, 3, 5, 4,
18: the left side for the ith row 1, 1, 1, 1,
1, 2, 4, 3,
1, 4, 6, 5,
1, 3, 5, 4,
19: the left side for the i + 1th row 1, 1, 1, 1,
1, 2, 4, 3,
1, 5, 6, 5,
1, 3, 5, 4,
20: the diagonal entry and right side for the ith row 1, 1, 1, 1,
1, 3, 5, 2,
1, 5, 6, 5,
1, 3, 5, 4,
21: the diagonal entry for the i + 1th row 1, 1, 1, 1,
1, 3, 5, 2,
1, 5, 7, 5,
1, 3, 5, 4,
22: calculate the lower triangular portion for the ith row 1, 1, 1, 1,
1, 3, 5, 2,
1, 5, 7, 5,
1, 3, 5, 4,
23: calculate the inverse elements for the ith and i + 1th rows 1, 1, 1, 1,
1, 6, 5, 2,
1, 5, 6, 5,
1, 3, 5, 4,
24: multiply the inverse element for the left side of the ith row 1, 1, 1, 1,
6, 6, 5, 2,
1, 5, 6, 5,
1, 3, 5, 4,
25: multiply the inverse element for the right side of the ith row 1, 1, 1, 1,
6, 6, 3, 7,
1, 5, 6, 5,
1, 3, 5, 4,
26: the right side for the i + 1th row 1, 1, 1, 1,
6, 6, 3, 7,
1, 5, 6, 2,
1, 3, 5, 4,
27: calculate the lower triangular portion for the i + 1th row 1, 1, 1, 1,
6, 6, 3, 7, -continued 2, 5, 6, 2,
1, 3, 5, 4,
28: multiply the inverse element for the left side of the i + 1th row 1, 1, 1, 1,
6, 6, 3, 7,
7, 3, 6, 2,
1, 3, 5, 4,
29: multiply the inverse element for the right side of the i + 1th row 1, 1, 1, 1,
6, 6, 3, 7,
7, 3, 6, 7,
1, 3, 5, 4,
30: calculate the last row 1, 1, 1, 1,
6, 6, 3, 7,
7, 3, 6, 7,
6, 3, 4, 2,
31: multiply the diagonal component for the last row 1, 1, 1, 1,
6, 6, 3, 7,
7, 3, 6, 7,
6, 1, 5, 2,
32: output (after streamlining of inverse elements)

1, 1, 1, 1,
6, 6, 3, 7,
7, 3, 6, 7,
6, 1, 5, 2,

Other Modifications Etc.

Incidentally, the present invention is not limited to the above-described embodiments. For example, the above-described various kinds of processing may be executed, in addition to being executed in chronological order in accordance with the descriptions, in parallel or individually depending on the processing power of an apparatus that executes the processing or when needed. In addition, it goes without saying that changes may be made as appropriate without departing from the spirit of the present invention.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present apparatus are implemented as a result of a predetermined program being executed on the computer, but at least part of these processing functions may be implemented by hardware.

INDUSTRIAL APPLICABILITY

The present invention is applicable to calculation of an inverse matrix of a regular matrix whose entries belong to an extension field in the field of cryptography, such as error correction code and secret sharing, for example. In addition, it can be widely employed in technical fields requiring solution of simultaneous equations (for example, the field of robotics such as driving control of robot arms), or those requiring solution of eigenvalue problems (for example, quantum circuitry design for quantum computers).

DESCRIPTION OF REFERENCE NUMERALS 1 to 4 matrix triangulation apparatus

What is claimed is:

1. A matrix triangulation apparatus comprising:
a memory; and
processing circuitry configured to take a first square matrix A formed from elements of a finite field as input and obtain and output at least some of entries of a second square matrix B which includes an upper triangular portion resulting from triangulation of the first square matrix A, where n is an integer equal to or greater than 4, A is an n×n square matrix, $A_{ij}$ is an entry in row i and column j of the square matrix, i=0, ..., n−1, and j=0, ..., n−1, β1:=β2 means setting β2 as β1, the processing circuitry being further configured to implement:
an input unit that receives the first square matrix A, each initial entry $A_{ij}$ is each entry in row i and column j of the first square matrix A that are stored in storage areas of the memory;
a first inverse element arithmetic unit that performs $A_{00}:=A_{00}^{-1}$ and stores $A_{00}$ in a storage area of the memory;
a first multiplicator that performs $A_{0j}:=A_{00}A_{0j}$ for j=1, ..., n−1 and stores $A_{0j}$ in storage areas of the memory;
a first reduction unit that performs reduction of the entry $A_{0j}$ obtained by the first multiplicator to obtain and output a result of the reduction of the entry $A_{0j}$ on a finite field in the processing circuitry and stores the result of the reduction of the entry $A_{0j}$ in the storage areas of the memory;

(1) in each of i=1, ..., n−1,
(1-1) for j=1, ..., i−1,
a first product-sum arithmetic unit that performs $$A_{ij} := \sum_{0 \le k < j} A_{ik} A_{kj}$$

and stores $A_{ij}$ in the storage areas of the memory;
a second reduction unit that performs reduction of the entry $A_{ij}$ obtained by the first product-sum arithmetic unit to obtain and output a result of the reduction of the entry $A_{ij}$ on the finite field in the processing circuitry and stores the result of the reduction of the entry $A_{ij}$ in the storage areas of the memory;
(1-2) for j=i, ..., n−1,
a second product-sum arithmetic unit that performs $$A_{ij} := \sum_{0 \le k < i} A_{ik} A_{kj}$$

and stores $A_{ij}$ in the storage areas of the memory;
a third reduction unit that performs reduction of the entry $A_{ij}$ obtained by the second product-sum arithmetic unit to obtain and output a result of the reduction of the entry $A_{ij}$ on the finite field in the processing circuitry and stores the result of the reduction of the entry $A_{ij}$ in the storage areas of the memory;
(1-3) for j=0, ..., i−2,
a third product-sum arithmetic unit that performs $$A_{ij} := \sum_{j+1 \le k < i} A_{ik} A_{kj}$$

and stores $A_{ij}$ in the storage areas of the memory;
a fourth reduction unit that performs reduction of the entry $A_{ij}$ obtained by the third product-sum arithmetic unit to obtain and output a result of the reduction of the entry $A_{ij}$ on the finite field in the processing circuitry and stores the result of the reduction of the entry $A_{ij}$ in the storage areas of the memory;
(1-4) a second inverse element arithmetic unit that performs $A_{ii}:=A_{ii}^{-1}$ and stores $A_{ii}$ in the storage areas of the memory;
(1-5) for j=0, ..., i−1,
a second multiplicator that performs $A_{ij}:=A_{ii}A_{ij}$ and stores $A_{ij}$ in the storage areas of the memory;
a fifth reduction unit that performs reduction of the entry $A_{ij}$ obtained by the second multiplicator to obtain and output a result of the reduction of the entry $A_{ij}$ on the finite field in the processing circuitry and stores the result of the reduction of the entry $A_{ij}$ in the storage areas of the memory;
(1-6) for j=i+1, ..., n−1,
a third multiplicator that performs $A_{ij}:=A_{ii}A_{ij}$ and stores $A_{ij}$ in the storage areas of the memory; and
a sixth reduction unit that performs reduction of the entry $A_{ij}$ obtained by the third multiplicator to obtain and output a result of the reduction of the entry $A_{ij}$ on the finite field in the processing circuitry and stores the result of the reduction of the entry $A_{ij}$ in the storage areas of the memory, (2) after a procedure of the third multiplicator and the sixth reduction unit at (1-6),
an output unit that outputs an n×n square matrix formed from entries $A_{ij}$ as the second square matrix B where i=0, . . . , n−1 and j=0, . . . , n−1, and
wherein
the second square matrix B is formed from a lower triangular portion of an n×n lower triangular matrix L and an upper triangular portion of an n×n upper triangular matrix A', a product of the lower triangular matrix L including the lower triangular portion and the first square matrix A will be the upper triangular matrix A' including the upper triangular portion, and
entries of the lower triangular portion are assigned to the storage areas of the memory for entries of the first square matrix A that become zero during a process of the triangulation of the first square matrix A.

2. The matrix triangulation apparatus according to claim 1, wherein
u-row and v-column entries of an n×n square matrix L with $L_{uv}=A_{uv}$ instead of $A_{uv}$ satisfying u≥v are obtained, and operation using $L_{uv}$ instead of $A_{uv}$ is performed.

3. A matrix triangulation apparatus comprising:
a memory; and
processing circuitry configured to take a first square matrix A formed from elements of a finite field as input and obtain and output at least some of entries of a second square matrix B which includes an upper triangular portion resulting from triangulation of the first square matrix A, where n is an integer equal to or greater than 4, A is an n×n square matrix, $A_{ij}$ is an entry in row i and column j of the square matrix, i=0, . . . , n−1, j=0, . . . , n−1, and r:=i+1, β1:=β2 means setting β2 as β1, the processing circuitry being further configured to implement:
an input unit that receives the first square matrix A, each initial entry $A_{ij}$ is each entry in row i and column j of the first square matrix A that are stored in storage areas of the memory;
a first inverse element arithmetic unit that performs $A_{00}:=A_{00}^{-1}$ and stores $A_{00}$ in a storage area of the memory;
a first multiplicator that performs $A_{0j}:=A_{00}A_{0j}$ for j=1, . . . , n−1 and stores $A_{0j}$ in storage areas of the memory;
a first reduction unit that performs reduction of the entry $A_{0j}$ obtained by the first multiplicator to obtain and output a result of the reduction of the entry $A_{0j}$ on a finite field in the processing circuitry and stores the result of the reduction of the entry $A_{0j}$ in the storage areas of the memory;
(1) in each of odd-numbered i=1, . . . , n−1,
(1-1) for j=1, . . . , i−1,
a first product-sum arithmetic unit that performs $$A_{ij} := \sum_{0 \le k < j} A_{ik} A_{kj}$$

and stores $A_{ij}$ in the storage areas of the memory;
a second reduction unit that performs reduction of the entry $A_{ij}$ obtained by the first product-sum arithmetic unit to obtain and output a result of the reduction of the entry $A_{ij}$ on the finite field in the processing circuitry and stores the result of the reduction of the entry $A_{ij}$ in the storage areas of the memory;
(1-1-1) for j'=1, . . . , r−1,
a second product-sum arithmetic unit that performs $$A_{rj'} := \sum_{0 \le k < j'} A_{rk} A_{kj'}$$

and stores $A_{ij}$ in the storage areas of the memory;
a third reduction unit that performs reduction of the entry $A_{rj'}$ obtained by the second product-sum arithmetic unit to obtain and output a result of the reduction of the entry $A_{rj'}$ on the finite field in the processing circuitry and stores the result of the reduction of the entry $A_{ij}$ in the storage areas of the memory;
(1-2) for j=i, . . . , n−1,
a third product-sum arithmetic unit that performs $$A_{ij} := \sum_{0 \le k < i} A_{ik} A_{kj}$$

and stores $A_{ij}$ in the storage areas of the memory;
a fourth reduction unit that performs reduction of the entry $A_{ij}$ obtained by the third product-sum arithmetic unit to obtain and output a result of the reduction of the entry $A_{ij}$ on the finite field in the processing circuitry and stores the result of the reduction of the entry $A_{ij}$ in the storage areas of the memory;
a fourth product-sum arithmetic unit that performs $$A_{rr} := \sum_{0 \le r < i} A_{rk} A_{kr}$$

and stores $A_{rr}$ in the storage areas of the memory;
a fifth reduction unit that performs reduction of the entry $A_{rr}$ obtained by the fourth product-sum arithmetic unit to obtain and output a result of the entry $A_{rr}$ on the finite field in the processing circuitry and stores the result of the reduction of the entry $A_{rr}$ the storage areas of the memory;
(1-3) for j=0, . . . , i−2,
a fifth product-sum arithmetic unit that performs $$A_{ij} := \sum_{j+1 \le k < i} A_{ik} A_{kj}$$

and stores $A_{ij}$ in the storage areas of the memory;
a sixth reduction unit that performs reduction of the entry $A_{ij}$ obtained by the fifth product-sum arithmetic unit to obtain and output a result of the entry $A_{ij}$ on the finite field in the processing circuitry and stores the result of the reduction of the entry $A_{ij}$ in the storage areas of the memory;
(1-4) a second inverse element arithmetic unit that obtains a determinant $$det = \begin{vmatrix} A_{ii} & A_{ir} \\ A_{ri} & A_{rr} \end{vmatrix}$$

and stores the determinant det in the storage areas of the memory;

a seventh reduction unit that performs reduction of the determinant det to obtain and output a result of the reduction of the determinant det on the finite field in the processing circuitry and stores the result of the reduction of the determinant det in the storage areas of the memory;

(1-5) a third inverse element arithmetic unit that performs inv:=$(A_{ii} \text{det})^{-1}$ and stores inv in the storage areas of the memory;

(1-6) a fourth inverse element arithmetic unit that performs $A_{ii}^{-1}$:=inv·det and stores $A_{ii}^{-1}$ in the storage areas of the memory;

an eighth reduction unit that performs reduction of the entry $A_{ii}^{-1}$ obtained by the fourth inverse element arithmetic unit to obtain and output a result of the reduction of the entry $A_{ii}^{-1}$ on the finite field in the processing circuitry and stores the result of the reduction of the entry $A_{ii}^{-1}$ in the storage areas of the memory;

(1-7) a fifth inverse element arithmetic unit that performs inv$A_{rr}$:=inv·$A_{ii}^2$ and stores inv$A_{rr}$ in the storage areas of the memory;

a ninth reduction unit that performs reduction of the entry inv$A_{rr}$ obtained by the fifth inverse element arithmetic unit to obtain and output a result of the reduction of the entry inv$A_{rr}$ on the finite field in the processing circuitry and stores the result of the reduction of the entry inv$A_{rr}$ in the storage areas of the memory;

(1-8) a second multiplicator that performs $A_{ij}$:=$A_{ii}^{-1}A_{ij}$ for j=0, . . . , i−1 and stores $A_{ij}$ in the storage areas of the memory;

a tenth reduction unit that performs reduction of the entry $A_{ij}$ obtained by the second multiplicator to obtain and output a result of the reduction of the entry $A_{ij}$ on the finite field in the processing circuitry and stores the result of the reduction of the entry $A_{ij}$ in the storage areas of the memory;

(1-9) a third multiplicator that performs $A_{ij}$:=$A_{ii}^{-1}A_{ij}$ for j=i+1, . . . , n−1 and stores $A_{ij}$ in the storage areas of the memory;

an eleventh reduction unit that performs reduction of the entry $A_{ij}$ obtained by the third multiplicator to obtain and output a result of the reduction of the entry $A_{ij}$ on the finite field in the processing circuitry and stores the result of the reduction of the entry $A_{ij}$ in the storage areas of the memory;

(1-10) for j=r+1, . . . , n−1, a sixth product-sum arithmetic unit that performs $$A_{rj} := \sum_{0 \leq k < r} A_{rk} A_{kj}$$

and stores $A_{rj}$ in the storage areas of the memory;

a twelfth reduction unit that performs reduction of the entry $A_{rj}$ obtained by the sixth product-sum arithmetic unit to obtain and output a result of the reduction of the entry $A_{rj}$ on the finite field in the processing circuitry and stores the result of the reduction of the entry $A_{rj}$ in the storage areas of the memory;

(1-11) for j=0, . . . , i−1, a seventh product-sum arithmetic unit that performs $$A_{rj} := \sum_{j+1 \leq k < i} A_{rk} A_{kj}$$

and stores $A_{rj}$ in the storage areas of the memory;

a thirteenth reduction unit that performs reduction of the entry $A_{rj}$ obtained by the seventh product-sum arithmetic unit to obtain and output a result of the reduction of the entry $A_{rj}$ on the finite field in the processing circuitry and stores the result of the reduction of the entry $A_{rj}$ in the storage areas of the memory;

(1-12) a fourth multiplicator that performs $A_{rj}$:=inv$A_{rr}A_{rj}$ for j=0, . . . , r−1 and stores $A_{rj}$ in the storage areas of the memory;

a fourteenth reduction unit that performs reduction of the entry $A_{rj}$ obtained by the fourth multiplicator to obtain and output a result of the reduction of the entry $A_{rj}$ on the finite field in the processing circuitry and stores the result of the reduction of the entry $A_{rj}$ in the storage areas of the memory;

(1-13) a fifth multiplicator that performs $A_{rj}$:=inv$A_{rr}A_{rj}$ for j=r+1, . . . , n−1 and stores $A_{rj}$ in the storage areas of the memory; and a fifteenth reduction unit that performs reduction of the entry $A_{rj}$ obtained by the fifth multiplicator to obtain and output a result of the reduction of the entry $A_{rj}$ on the finite field in the processing circuitry and stores the result of the reduction of the entry $A_{rj}$ in the storage areas of the memory, and wherein the second square matrix B is formed from a lower triangular portion of an n×n lower triangular matrix L and an upper triangular portion of an n×n upper triangular matrix A', a product of the lower triangular matrix L including the lower triangular portion and the first square matrix A will be the upper triangular matrix A' including the upper triangular portion, and entries of the lower triangular portion are assigned to storage areas of the memory for entries of the first square matrix A that become zero during a process of the triangulation of the first square matrix A.

4. A matrix triangulation method taking a first square matrix A formed from elements of a finite field as input and obtaining and outputting at least some of entries of a second square matrix B which includes an upper triangular portion resulting from triangulation of the first square matrix A, where n is an integer equal to or greater than 4, A is an n×n square matrix, $A_{ij}$ is an entry in row i and column j of the square matrix, i=0, . . . , n−1, and j=0, . . . , n−1, β1:=β2 means setting β2 as β1, the matrix triangulation method comprising:

an input step of receiving the first square matrix A, each initial entry $A_{ij}$ is each entry in row i and column j of the first square matrix A;

a first inverse element arithmetic step of performing $A_{00}$:=$A_{00}^{-1}$ and stores $A_{00}$ in a storage area of the memory;

a first multiplication step of performing $A_{0j}$:=$A_{00}A_{0j}$ for j=1, . . . , n−1 and storing $A_{0j}$ in storage areas of the memory;

a first reduction step of performing reduction of the entry $A_{0j}$ obtained by the first multiplication step to obtain and output a result of the reduction of the entry $A_{0j}$ on a finite field in a processing circuitry and storing the result of the reduction of the entry $A_{0j}$ in the storage areas of the memory;

(1) in each of i=1, ..., n−1,
(1-1) for j=1, ..., i−1,
a first product-sum arithmetic step of performing $$A_{ij} := \sum_{0 \le k < j} A_{ik} A_{kj}$$

and storing $A_{ij}$ in the storage areas of the memory;
a second reduction step of performing reduction of the entry $A_{ij}$ obtained by the first product-sum arithmetic unit to obtain and output a result of the reduction of the entry $A_{ij}$ on the finite field in the processing circuitry and storing the result of the reduction of the entry $A_{ij}$ in the storage areas of the memory;
(1-2) for j=i, ..., n−1,
a second product-sum arithmetic unit that performs $$A_{ij} := \sum_{0 \le k < i} A_{ik} A_{kj}$$

and storing $A_{ij}$ in the storage areas of the memory;
a third reduction step of performing reduction of the entry $A_{ij}$ obtained by the second product-sum arithmetic unit to obtain and output a result of the reduction of the entry $A_{ij}$ on the finite field in the processing circuitry and storing the result of the reduction of the entry $A_{ij}$ in the storage areas of the memory;
(1-3) for j=0, ..., i−2,
a third product-sum arithmetic step of performing $$A_{ij} := \sum_{j+1 \le k < i} A_{ik} A_{kj}$$

and storing $A_{ij}$ in the storage areas of the memory;
a fourth reduction step of performing reduction of the entry $A_{ij}$ obtained by the third product-sum arithmetic unit to obtain and output a result of the reduction of the entry $A_{ij}$ on the finite field in the processing circuitry and storing the result of the reduction of the entry $A_{ij}$ in the storage areas of the memory;
(1-4) a second inverse element arithmetic step of performing $A_{ii} := A_{ii}^{-1}$ and storing $A_{ii}$ in the storage areas of the memory;
(1-5) for j=0, ..., i−1,
a second multiplication step of performing $A_{ij} := A_{ii} A_{ij}$ and storing $A_{ij}$ in the storage areas of the memory;
a fifth reduction step of performing reduction of the entry $A_{ij}$ obtained by the second multiplication step to obtain and output a result of the reduction of the entry $A_{ij}$ on the finite field in the processing circuitry and storing the result of the reduction of the entry $A_{ij}$ in the storage areas of the memory;
(1-6) for j=i+1, ..., n−1,
a third multiplication step of performing $A_{ij} := A_{ii} A_{ij}$ and storing $A_{ij}$ in the storage areas of the memory; and
a sixth reduction step of performing reduction of the entry $A_{ij}$ obtained by the third multiplication step to obtain and output a result of the reduction of the entry $A_{ij}$ on the finite field in the processing circuitry and storing the result of the reduction of the entry $A_{ij}$ in the storage areas of the memory, (2) after a procedure of the third multiplication step and the sixth reduction step at (1-6), and
an outputting step of outputting an n×n square matrix formed from entries $A_{ij}$ as the second square matrix B where i=0, ..., n−1 and j=0, ..., n−1,
wherein
the second square matrix B is formed from a lower triangular portion of an n×n lower triangular matrix L and an upper triangular portion of an n×n upper triangular matrix A', a product of the lower triangular matrix L including the lower triangular portion and the first square matrix A will be the upper triangular matrix A' including the upper triangular portion, and
entries of the lower triangular portion are assigned to storage areas of the memory for entries of the first square matrix A that become zero during a process of the triangulation of the first square matrix A.

5. A matrix triangulation method taking a first square matrix A formed from elements of a finite field as input and obtaining and outputting at least some of entries of a second square matrix B which includes an upper triangular portion resulting from triangulation of the first square matrix A, where n is an integer equal to or greater than 4, A is an n×n square matrix, $A_{ij}$; is an entry in row i and column j of the square matrix, i=0, ..., n−1, j=0, ..., n−1, and r:=i+1, β1:=β2 means setting β2 as β1, the matrix triangulation method comprising:
an input step of receiving the first square matrix A, each initial entry $A_{ij}$ is each entry in row i and column j of the first square matrix A;
a first inverse element arithmetic step of performing $A_{00} := A_{00}^{-1}$ and storing $A_{00}$ in a storage area of a memory;
a first multiplication step of performing $A_{0j} := A_{00} A_{0j}$ for j=1, ..., n−1 and storing $A_{0j}$ in storage areas of the memory;
a first reduction step of performing reduction of the entry $A_{0j}$ obtained by the first multiplication step to obtain and output a result of the reduction of the entry $A_{0j}$ on a finite field in a processing circuitry and storing the result of the reduction of the entry $A_{0j}$ in the storage areas of the memory;
(1) in each of odd-numbered i=1, ..., n−1,
(1-1) for j=1, ..., i−1,
a first product-sum arithmetic step of performing $$A_{ij} := \sum_{0 \le k < j} A_{ik} A_{kj}$$

and storing $A_{ij}$ in the storage areas of the memory;
a second reduction step of performing reduction of the entry $A_{ij}$ obtained by the first product-sum arithmetic step to obtain and output a result of the reduction of the entry $A_{ij}$ on the finite field in the processing circuitry and storing the result of the reduction of the entry $A_{ij}$ in the storage areas of the memory;
(1-1-1) for j'=1, ..., r−1,
a second product-sum arithmetic step of performing $$A_{rj'} := \sum_{0 \le k < j'} A_{rk} A_{kj'}$$

and storing $A_{ij'}$ in the storage areas of the memory;

a third reduction step of performing reduction of the entry $A_{rj'}$ obtained by the second product-sum arithmetic step to obtain and output a result of the reduction of the entry $A_{rj'}$ on the finite field in the processing circuitry and storing the result of the reduction of the entry $A_{rj'}$ in the storage areas of the memory;

(1-2) for j=i, ..., n−1, a third product-sum arithmetic step of performing $$A_{ij} := \sum_{0 \le k < i} A_{ik} A_{kj}$$

and storing $A_{ij}$ in the storage areas of the memory;

a fourth reduction step of performing reduction of the entry $A_{ij}$ obtained by the third product-sum arithmetic step to obtain and output a result of the reduction of the entry $A_{ij}$ on the finite field in the processing circuitry and storing the result of the reduction of the entry $A_{ij}$ in the storage areas of the memory;

a fourth product-sum arithmetic step of performing $$A_{rr} := \sum_{0 \le r < i} A_{rk} A_{kr}$$

and storing $A_{rr}$ in the storage areas of the memory;

a fifth reduction step of performing reduction of the entry $A_{rr}$ obtained by the fourth product-sum arithmetic step to obtain and output a result of the reduction of the entry $A_{rr}$ on the finite field in the processing circuitry and storing the result of the reduction of the entry $A_{rr}$ in the storage areas of the memory;

(1-3) for j=0, ..., i−2, a fifth product-sum arithmetic step of performing $$A_{ij} := \sum_{j+1 \le k < i} A_{ik} A_{kj}$$

and storing $A_{ij}$ in the storage areas of the memory;

a sixth reduction step of performing reduction of the entry $A_{ij}$ obtained by the fifth product-sum arithmetic step to obtain and output a result of the entry $A_{ij}$ on the finite field in the processing circuitry and storing the result of the reduction of the entry $A_{ij}$ in the storage areas of the memory;

(1-4) a second inverse element arithmetic step of obtaining a determinant $$\det = \begin{vmatrix} A_{ii} & A_{ir} \\ A_{ri} & A_{rr} \end{vmatrix}$$

and storing the determinant det in the storage areas of the memory;

a seventh reduction step of performing reduction of the determinant det to obtain and output a result of the reduction of the determinant det on the finite field in the processing circuitry and storing the result of the reduction of the determinant det in the storage areas of the memory;

(1-5) a third inverse element arithmetic step of performing inv:=$(A_{ii} \det)^{-1}$ and storing inv in the storage areas of the memory;

(1-6) a fourth inverse element arithmetic step of performing $A_{ii}^{-1}$:=inv·det and storing $A_{ii}^{-1}$ in the storage areas of the memory;

an eighth reduction step of performing reduction of the entry $A_{ii}^{-1}$ obtained by the fourth inverse element arithmetic step to obtain and output a result of the reduction of the entry $A_{ii}^{-1}$ on the finite field in the processing circuitry and storing the result of the reduction of the entry $A_{ii}^{-1}$ in the storage areas of the memory;

(1-7) a fifth inverse element arithmetic step of performing inv$A_{rr}$:=inv·$A_{ii}^2$ and storing inv$A_{rr}$ in the storage areas of the memory;

a ninth reduction step of performing reduction of the entry inv$A_{rr}$ obtained by the fifth inverse element arithmetic step to obtain and output a result of the reduction of the entry inv$A_{rr}$ on the finite field in the processing circuitry and storing the result of the reduction of the entry inv$A_{rr}$ in the storage areas of the memory;

(1-8) a second multiplication step of performing $A_{ij}$:=$A_{ii}^{-1} A_{ij}$ for j=0, ..., i−1 and storing $A_{ij}$ in the storage areas of the memory;

a tenth reduction step of performing reduction of the entry $A_{ij}$ obtained by the second multiplication step to obtain and output a result of the reduction of the entry $A_{ij}$ on the finite field in the processing circuitry and storing the result of the reduction of the entry $A_{ij}$ in the storage areas of the memory;

(1-9) a third multiplication step of performing $A_{ij}$:=$A_{ii}^{-1} A_{ij}$ for j=i+1, ..., n−1 and storing $A_{ij}$, in the storage areas of the memory;

an eleventh reduction step of performing reduction of the entry $A_{ij}$ obtained by the third multiplication step to obtain and output a result of the reduction of the entry $A_{ij}$ on the finite field in the processing circuitry and stores the result of the reduction of the entry $A_{ij}$ in the storage areas of the memory;

(1-10) for j=r+1, ..., n−1, a sixth product-sum arithmetic step of performing $$A_{rj} := \sum_{0 \le k < r} A_{rk} A_{kj}$$

and storing $A_{rj}$ in the storage areas of the memory;

a twelfth reduction step of performing reduction of the entry $A_{rj}$ obtained by the sixth product-sum arithmetic step to obtain and output a result of the reduction of the entry $A_{rj}$ on the finite field in the processing circuitry and stores the result of the reduction of the entry $A_{rj}$ in the storage areas of the memory;

(1-11) for j=0, ..., i−1, a seventh product-sum arithmetic step of performing $$A_{rj} := \sum_{j+1 \le k < i} A_{rk} A_{kj}$$

and storing $A_{rj}$ in the storage areas of the memory;

a thirteenth reduction step of performing reduction of the entry $A_{rj}$ obtained by the seventh product-sum arithmetic step to obtain and output a result of the reduction of the entry $A_{rj}$ on the finite field in the processing circuitry and storing the result of the reduction of the entry $A_{rj}$ in the storage areas of the memory;

(1-12) a fourth multiplication step of performing $A_{rj}:=invA_{rr}A_{rj}$ for $j=0, \ldots, r-1$ and storing $A_{rj}$ in the storage areas of the memory;

a fourteenth reduction step of performing reduction of the entry $A_{rj}$ obtained by the fourth multiplication step to obtain and output a result of the reduction of the entry $A_{rj}$ on the finite field in the processing circuitry and storing the result of the reduction of the entry $A_{rj}$ in the storage areas of the memory;

(1-13) a fifth multiplication step of performing $A_{rj}:=invA_{rr}A_{rj}$ for $j=r+1, \ldots, n-1$ and storing $A_{rj}$ in the storage areas of the memory; and a fifteenth reduction step of performing reduction of the entry $A_{rj}$ obtained by the fifth multiplication step to obtain and output a result of the reduction of the entry $A_{rj}$ on the finite field in the processing circuitry and storing the result of the reduction of the entry $A_{rj}$ in the storage areas of the memory, wherein the second square matrix B is formed from a lower triangular portion of an n×n lower triangular matrix L and an upper triangular portion of an n×n upper triangular matrix A', a product of the lower triangular matrix L including the lower triangular portion and the first square matrix A will be the upper triangular matrix A' including the upper triangular portion, and entries of the lower triangular portion are assigned to storage areas of the memory for entries of the first square matrix A that become zero during a process of the triangulation of the first square matrix A.

\* \* \* \* \*